(12) United States Patent
Ganesan et al.

(10) Patent No.: US 11,286,995 B1
(45) Date of Patent: Mar. 29, 2022

(54) DUAL-ACTING PISTON HYDRAULIC CLUTCH ASSEMBLY

(71) Applicant: Deere & Company, Moline, IL (US)

(72) Inventors: Satheesh Ganesan, Kancheepuram (IN); Kevin M. Allen, Bartlesville, OK (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/236,795

(22) Filed: Apr. 21, 2021

(51) Int. Cl.
| F16D 25/0638 | (2006.01) |
| F16D 21/00 | (2006.01) |
| F16D 48/02 | (2006.01) |
| F16D 25/12 | (2006.01) |
| F16D 21/04 | (2006.01) |

(52) U.S. Cl.
CPC ......... F16D 25/0638 (2013.01); F16D 21/00 (2013.01); F16D 25/123 (2013.01); F16D 25/14 (2013.01); F16D 21/04 (2013.01)

(58) Field of Classification Search
CPC .... F16D 21/00; F16D 25/123; F16D 25/0638; F16D 25/14; F16D 25/10
See application file for complete search history.

(56) References Cited

U.S. PATENT DOCUMENTS

| 5,024,306 A | 6/1991 | Fukui et al. |
| 7,802,667 B2 | 9/2010 | Raszkowski et al. |
| 7,921,975 B2 | 4/2011 | Ogasawara et al. |
| 9,624,986 B2 | 4/2017 | Nakano et al. |
| 10,611,229 B2 | 4/2020 | Ohnemus |
| 2010/0025180 A1 | 2/2010 | Kanno et al. |

(Continued)

FOREIGN PATENT DOCUMENTS

| CN | 110701207 A | * | 1/2020 |
| CN | 110701208 A | * | 1/2020 |

(Continued)

OTHER PUBLICATIONS

"Hydraulic Solenoid Types" retrieved from www.solenoidsupplier.com/on-off-solenoid-vs-proportional-solenoid/ (Year: 2021).*

*Primary Examiner* — Stacey A Fluhart
(74) *Attorney, Agent, or Firm* — Klintworth & Rozenblat IP LLP

(57) ABSTRACT

A hydraulic clutch assembly includes a housing defining an internal cavity, a shaft, a clutch pack, a piston and a cylinder. The shaft extends within the internal cavity along a rotation axis for a rotatable member. The clutch pack includes interleaved plates and discs which are configured to rotationally couple the rotatable member to the shaft. The piston may be disposed within the internal cavity of the housing. The piston includes a first piston region and a second piston region. The first piston region is configured to engage the clutch pack while the second piston region is spaced radially from the first piston region. The piston may be arranged within the housing to define a first pressure chamber between the piston and the housing. The cylinder may be disposed within the internal cavity of the housing and may include a hollow interior for receiving the second piston region. The second piston region and the cylinder may define a second pressure chamber.

14 Claims, 12 Drawing Sheets

(56) References Cited

U.S. PATENT DOCUMENTS

| | | | | |
|---|---|---|---|---|
| 2010/0206253 A1* | 8/2010 | Fujimoto | ............ | F16D 48/0206 |
| | | | | 123/90.15 |
| 2015/0354700 A1 | 12/2015 | Sugiura | | |
| 2016/0097428 A1* | 4/2016 | Calvert | ............... | F16D 25/0638 |
| | | | | 192/85.61 |
| 2019/0234469 A1* | 8/2019 | Devendran | ......... | F16H 61/0025 |
| 2020/0018361 A1* | 1/2020 | Kummer | ............. | F16D 25/0638 |

FOREIGN PATENT DOCUMENTS

| | | | |
|---|---|---|---|
| EP | 2464885 B1 | 11/2019 | |
| EP | 3184857 B1 | 4/2020 | |
| EP | 3428480 B1 | 4/2020 | |
| JP | 2015172378 A | 10/2015 | |
| WO | 2020084913 A1 | 4/2020 | |

* cited by examiner

DUAL-ACTING PISTON HYDRAULIC CLUTCH ASSEMBLY

CROSS-REFERENCE TO RELATED APPLICATION

Not applicable

STATEMENT OF FEDERALLY SPONSORED RESEARCH OR DEVELOPMENT

Not applicable.

FIELD OF THE DISCLOSURE

This disclosure generally relates to clutch arrangements such as those implemented in the transmissions of work vehicles.

BACKGROUND OF THE DISCLOSURE

Hydraulic clutches are implemented in various ways (e.g., propulsion drive systems, transmissions and so on) in heavy-duty self-propelled vehicles, such as motor graders and the like. Such work vehicles may have transmissions (e.g., powershift transmissions), for example, which may incorporate clutch packs and countershaft gears that are in constant or intermittent mesh. The clutch assemblies may enable the work vehicles to move between forward and rearward drive modes as well as at various speed and torque ranges.

SUMMARY OF THE DISCLOSURE

The hydraulic clutch assembly according to various embodiments of the present disclosure provides for hydraulically actuated engagement and disengagement without the need for mechanical biasing members (e.g., springs).

In one example, a hydraulic clutch assembly of the present disclosure includes a housing defining an internal cavity, a shaft, a clutch pack, a piston and a cylinder. The shaft extends within the internal cavity along a rotation axis for a rotatable member. The clutch pack includes interleaved plates and discs which are configured to rotationally couple the rotatable member to the shaft. The piston may be disposed within the internal cavity of the housing. The piston includes a first piston region and a second piston region. The first piston region is configured to engage the clutch pack while the second piston region is spaced radially from the first piston region. The piston may be arranged within the housing to define a first pressure chamber between the piston and the housing. The cylinder may be disposed within the internal cavity of the housing and may include a hollow interior for receiving the second piston region. The second piston region and the cylinder may define a second pressure chamber. Hydraulic pressure to the first pressure chamber may drive the piston axially toward the clutch pack to apply an engagement force from the first piston region to the clutch pack. In order to remove the engagement force of the first piston region from the clutch pack, hydraulic pressure may be applied to the second pressure chamber as the sole means of driving the piston axially away from the clutch pack.

In yet another example embodiment of the present disclosure, a hydraulic clutch assembly of the present disclosure includes a housing defining an internal cavity, a shaft, a clutch pack, a piston and a cylinder. The shaft extends within the internal cavity along a rotation axis for a rotatable member. The clutch pack includes interleaved plates and discs which are configured to rotationally couple the rotatable member to the shaft. The piston may be disposed within the internal cavity of the housing. The piston includes a first piston region and a second piston region. The first piston region is configured to engage the clutch pack while the second piston region is spaced radially from the first piston region. The piston may be arranged within the housing to define a first pressure chamber between the piston and the housing. The cylinder may be disposed within the internal cavity of the housing about the shaft and may include a hollow interior for receiving the second piston region. The second piston region and the cylinder may define a second pressure chamber. Hydraulic pressure to the first pressure chamber may drive the piston axially toward the clutch pack to apply an engagement force from the first piston region to the clutch pack. In order to remove the engagement force of the first piston region from the clutch pack, hydraulic pressure may be applied to the second pressure chamber as the sole means of driving the piston axially away from the clutch pack.

Other features and advantages of the present invention will be apparent from the following description.

BRIEF DESCRIPTION OF THE DRAWINGS

At least one example of the present disclosure will hereinafter be described in conjunction with the following figures.

DETAILED DESCRIPTION OF THE PREFERRED EMBODIMENTS

Figure 1:
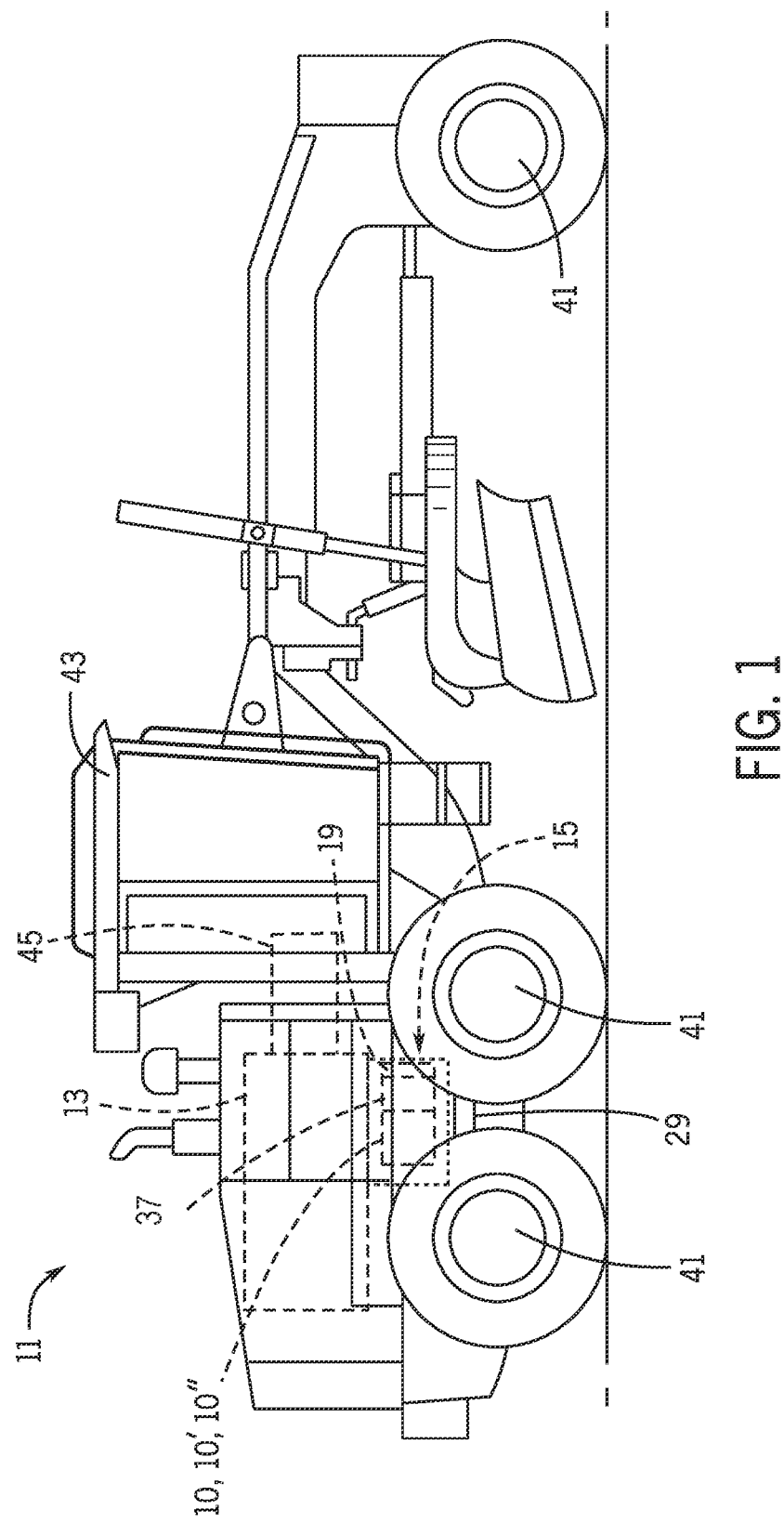
FIG. 1 is a simplified side view of an example work vehicle in which is incorporated a hydraulic clutch assembly according to various embodiments of the present disclosure.

The following describes one or more example embodiments of the hydraulic clutch assembly as shown in the accompanying figures of the drawings described briefly above. Various modifications to the example embodiments may be contemplated by one of skill in the art.

Also, as used herein, "between" may be used with reference to a particular sequence or order of power transmission elements, rather than with regard to physical orientation or placement of the elements. For example, a clutch device may be considered as being "between" an engine and an output component if power is routed to the output component via the clutch device, whether or not the engine and the output component are on physically opposite sides of the clutch device.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

In the discussion below, various example configurations of shafts, gears, and other power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

Overview

Over time, clutch packs used in various aspects of a work vehicle components (e.g., drives, transmissions, etc.) wear and change dimension as the friction material is consumed from use. This can require the actuating piston to travel a greater length in order to engage the clutch pack as the wear increases. In conventional spring return clutch assemblies, this increased travel distance can negatively impact the effectiveness of the piston's return spring to fully push the piston to its disengaged position away from the associated clutch pack. As the travel distance of the piston increases over time due to the progressively thinning/shortening of the clutch pack, the traditional arrangement will also require progressively increasing spring return forces on the piston to keep the piston in the disengaged position away from the clutch pack. Moreover, given that either one of the clutch discs or clutch plates for each clutch pack may be splined to an input or other shaft and rotating via input torque (e.g., from work vehicle engine and torque converter or other power source (e.g., electric motor)), centrifugal forces hydraulic or other fluids may impart forces on a disengaged piston so as to inadvertently engage the clutch pack by advancing the piston toward the clutch pack. Accordingly, conventional spring-piston arrangements may be susceptable to such centrifugal forces wherein the clutch pack may be inadvertently engaged.

A hydraulic clutch assembly of the present disclosure provides a robust design which enables disengagement despite the thinning/shortening of the clutch pack. The present disclosure further eliminates the need to implement return springs. In one example, the assembly includes a housing defining an internal cavity, a shaft, a clutch pack, a piston and a cylinder. The piston may be disposed within the internal cavity of the housing. The piston includes a first piston region and a second piston region. The first piston region is configured to engage the clutch pack while the second piston region is spaced radially from the first piston region. The piston may be arranged within the housing to define a first pressure chamber between the piston and the housing. The cylinder may be disposed within the internal cavity of the housing and may include a hollow interior for receiving the second piston region. The second piston region and the cylinder may define a second pressure chamber. Hydraulic pressure to the first pressure chamber may drive the piston axially toward the clutch pack to apply an engagement force from the first piston region to the clutch pack. In order to remove the engagement force of the first piston region from the clutch pack, hydraulic pressure may be applied to the second pressure chamber as the sole means of driving the piston axially away from the clutch pack. Accordingly, the piston is a dual-acting piston. The various embodiments of the hydraulic clutch assembly of the present disclosure may include only one clutch pack or may include more clutch packs as later described herein.

The piston may also include a lubrication flow passage which is configured to align with the lubrication shaft opening. The lubrication flow passage may be configured to allow communication of the lubrication shaft opening to the internal cavity of the housing when the clutch pack is engaged.

In various embodiments, a first hydraulic pressure passageway may be defined in the shaft wherein the first hydraulic pressure passageway is fluidly coupled to a hydraulic pressure source. A second hydraulic pressure passageway may also be defined in the shaft wherein the second hydraulic pressure passageway is configured to couple to the same hydraulic pressure source. The hydraulic clutch assembly of the present disclosure may further include a control valve configured to selectively couple the hydraulic pressure source to either the first hydraulic pressure passageway or the second hydraulic pressure passageway when the first and second hydraulic pressure passageways share the same hydraulic pressure source. This control valve may be a proportional valve. Alternatively, the first and second hydraulic pressure passageways may each have dedicated, separate hydraulic pressure sources.

As indicated, embodiments of the present disclosure may, but need not, include more than one clutch pack. In another example where at least two clutch packs are implemented, the aforementioned clutch pack may be a first clutch pack while the piston is a first piston. The hydraulic clutch assembly may further include a second clutch pack, a second piston, and a second cylinder as well as two hydraulic pressure passageways. The second piston may be disposed within the internal cavity of the housing. The second piston may include a third piston region and a fourth piston region. The third piston region may be configured to engage the second clutch pack while the fourth piston region may be spaced radially from the third piston region. The second piston may be arranged within the housing to define a third pressure chamber between the second piston and the housing. The second cylinder may be disposed within the internal cavity of the housing and may also have a hollow interior for receiving the fourth piston region to define a fourth pressure chamber between the fourth piston region and the second cylinder.

In the example arrangement using first and second clutch packs, the first pressure chamber and the fourth pressure chamber may be in communication via the first hydraulic pressure passageway while the second pressure chamber and the third pressure chamber are in communication via the second hydraulic pressure passageway. Application of pressure to the first hydraulic pressure passageway causes the first piston to engage the first clutch pack and second piston to simultaneously disengage the second clutch pack whereas application of pressure to the second hydraulic pressure passageway causes the second piston to engage the second clutch pack and the first piston to simultaneously disengage the first clutch pack. Accordingly, each of the first and second pistons are dual-acting pistons in that each piston has two features or regions interfacing with two pressure areas to impart two motions on the piston, and in turn effecting or allowing two motions to be imparted on each clutch pack. This arrangement using two clutch packs may also include a second rotatable member which is coupled to the shaft at an opposite end from a first rotatable member, previously referenced as "the rotatable member."

Where first and second clutch packs are implemented as described above, the first hydraulic pressure passageway may be fluidly coupled to a hydraulic pressure source wherein the second hydraulic pressure passageway is also configured to couple to the same hydraulic pressure source. In this arrangement using a shared pressure source between the first and second hydraulic pressure passageways, a control valve may be used to direct fluid pressure between either the first hydraulic pressure passageway or the second hydraulic pressure passageway. Alternatively, each of the first and second hydraulic pressure passageways may have a dedicated, separated pressure source.

In yet another example embodiment of the present disclosure, a hydraulic clutch assembly of the present disclosure includes three hydraulic pressure passageways which may be implemented in conjunction with first and second clutch packs. This example hydraulic clutch may include a housing defining an internal cavity, a shaft, a first clutch pack, a first piston, a first cylinder, a second clutch pack, a second piston, a second cylinder, three hydraulic pressure passageways and a lubrication passageway. The shaft may extend within the internal cavity along a rotation axis for rotating a first rotatable member and a second rotatable member. The first piston region is configured to engage the first clutch pack. The first piston may be arranged within the housing to define a first pressure chamber between the first piston and the housing. The first cylinder may be disposed within the internal cavity of the housing about the shaft. The first cylinder includes a first hollow interior receiving the second piston region to define a second pressure chamber between the second piston region and the first cylinder.

In this example embodiment, the second piston may also be disposed within the internal cavity of the housing. The second piston includes a third piston region and a fourth piston region spaced radially from the third piston region. The second piston may be arranged within the housing to define a third pressure chamber between the second piston and the housing. The second cylinder defines a second hollow interior which receives the fourth piston region. A fourth pressure chamber is defined between the fourth piston region and the second cylinder.

In the example embodiment having at least three hydraulic pressure passageways, a first hydraulic pressure passageway may also be defined in the shaft where the first hydraulic pressure passageway is configured to fluidly couple the first pressure chamber to a first hydraulic pressure source. With respect to the third pressure chamber, a third hydraulic pressure passageway may be defined in the shaft where the third hydraulic pressure passageway is configured to couple the third pressure chamber to the first hydraulic pressure source. A valve may be implemented at the pressure source to alternatively deliver fluid pressure to either the first hydraulic pressure passageway (and the first pressure chamber) or the third hydraulic pressure passageway (and the third pressure chamber). With respect to the second and fourth pressure chambers, a fourth hydraulic pressure passageway may be defined in the shaft where the fourth hydraulic pressure passageway is configured to couple second and fourth pressure chambers to a second hydraulic pressure source. In this arrangement, the second and fourth pressure chambers are maintained at a constant pressure via the second hydraulic pressure source.

Example Hydraulic Clutch Assemblies Using Dual-Acting Pistons

Referring now to FIG. 1, a work vehicle 11, such as a motor grader, is shown having a transmission 15 and a controller 19 which is in communication with a pump 37 for the hydraulic clutch assembly according to various embodiments of the present disclosure. As will become apparent from the discussion herein, the disclosed hydraulic clutch assembly may be used advantageously in a variety of settings and with a variety of machinery. In the example shown in FIG. 1, the transmission 15 may include a hydraulic clutch assembly 10, 10', 10" according to the present disclosure which receives torque output of a power system 13 (e.g., through a flywheel (not shown)) and which is in communication with the controller 19. The power system (or drivetrain assembly) 13 may be included in a work vehicle 11, which as noted is depicted as a motor grader. It will be understood, however, that other configurations may be possible, including configurations with work vehicle 11 as a different kind of work vehicle (e.g., a loader, dozer, tractor, harvester, sprayer and the like). It will further be understood that aspects of the power system 13 may also be used in non-work vehicles and non-vehicle applications (e.g., fixed-location installations).

Briefly, the work vehicle 11 has a main frame or chassis 29 supported by ground-engaging wheels 41, at least the front wheels of which are steerable. The chassis 29 supports the power system 13 and an operator cabin 43 in which operator interface and controls (e.g., various joysticks, switches levers, buttons, touchscreens, keyboards, speakers and microphones associated with a speech recognition system) are provided. In the event the work vehicle is an autonomous vehicle, the operator cabin 43 and associated operator controls may be omitted. As schematically shown, the power system 13 may be an internal combustion engine or other suitable power source (e.g., electric machine (e.g., motor) and storage device (e.g., battery)) that is suitably coupled to propel the work vehicle 11 via the wheels 41, either autonomously or based on commands from an operator. A battery 45 may represent any one or more suitable energy storage devices that may be used to provide electric power to various systems of the work vehicle 11.

Figure 2:
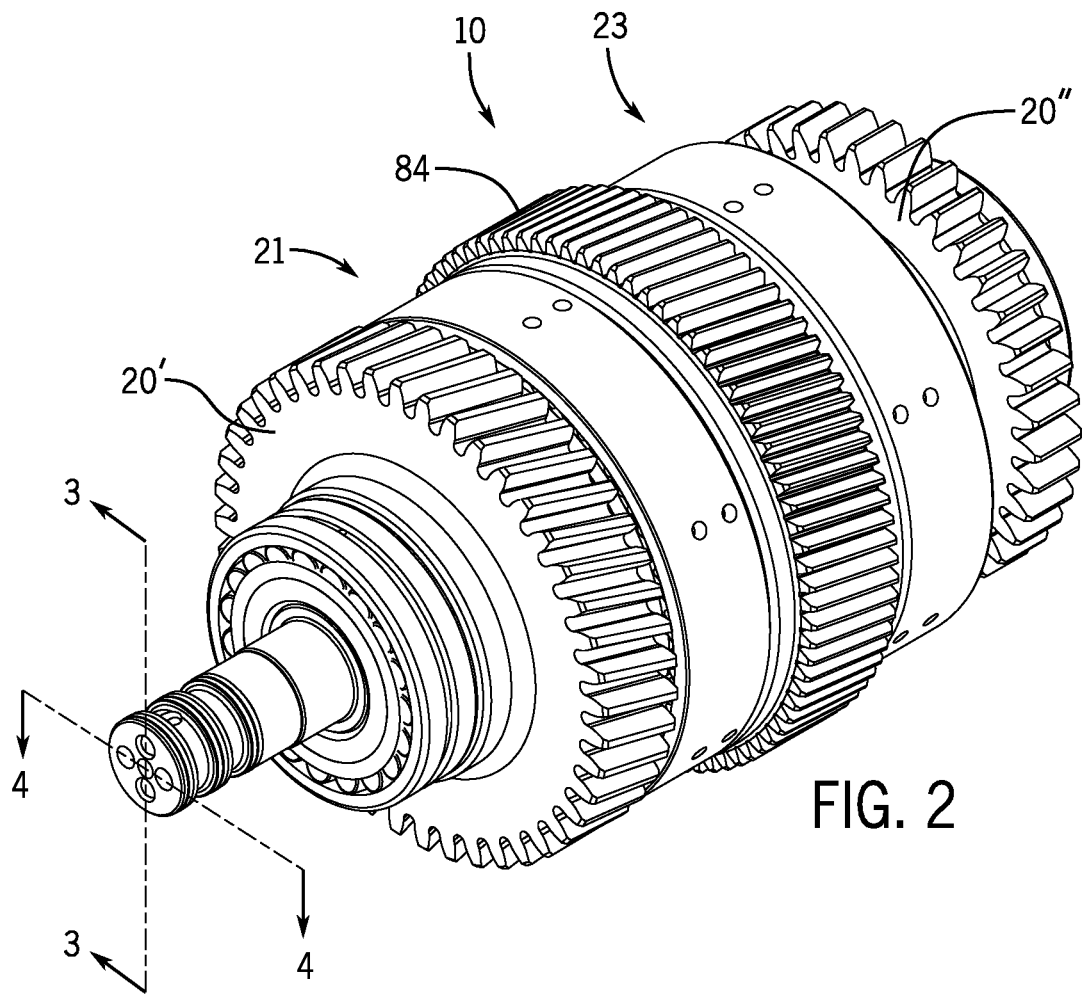
FIG. 2 is an isometric view of a first example of the hydraulic clutch assembly.
Figure 3:
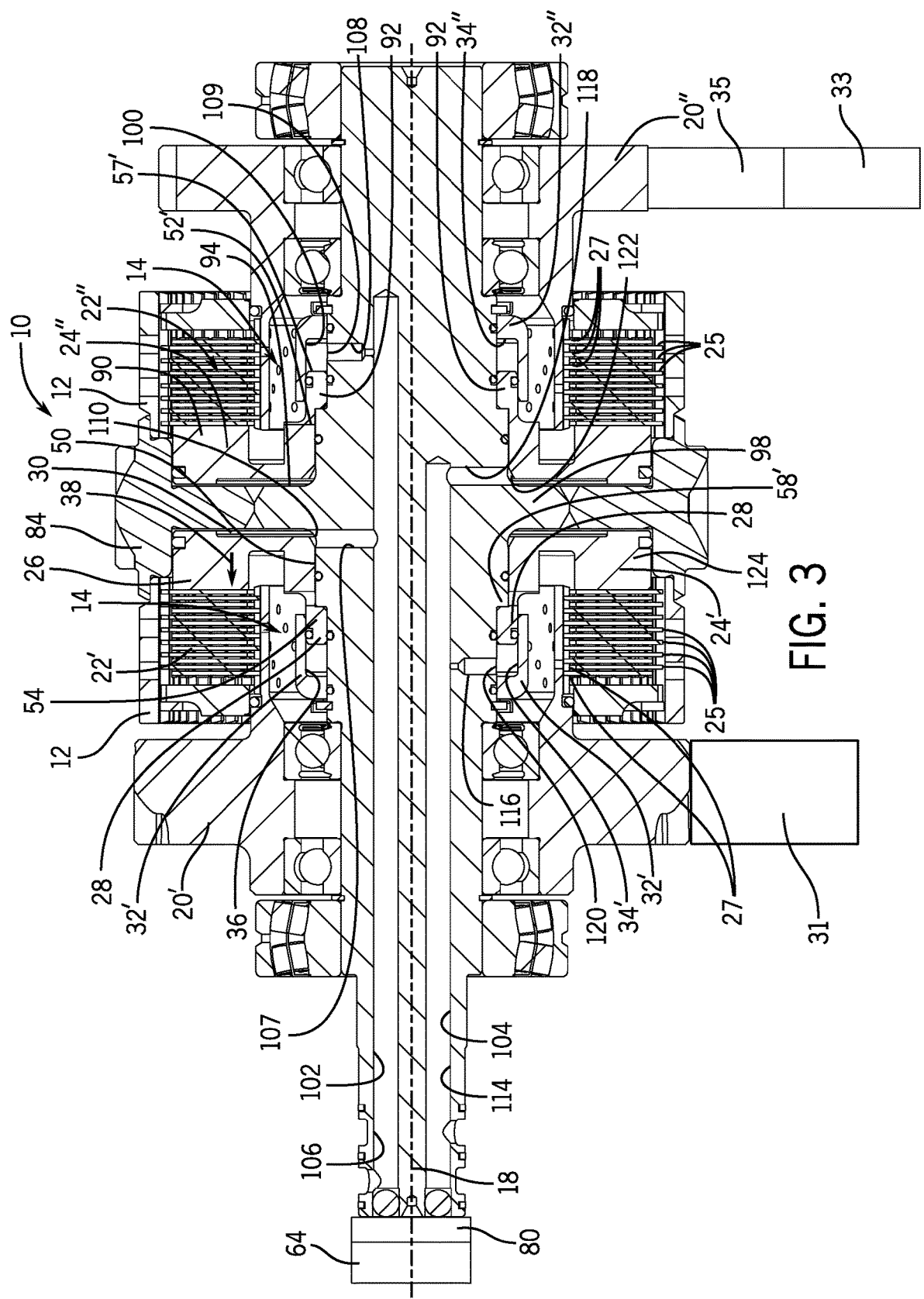
FIG. 3 is a sectional view thereof taken along line 3-3 of FIG. 2.
Figure 4:
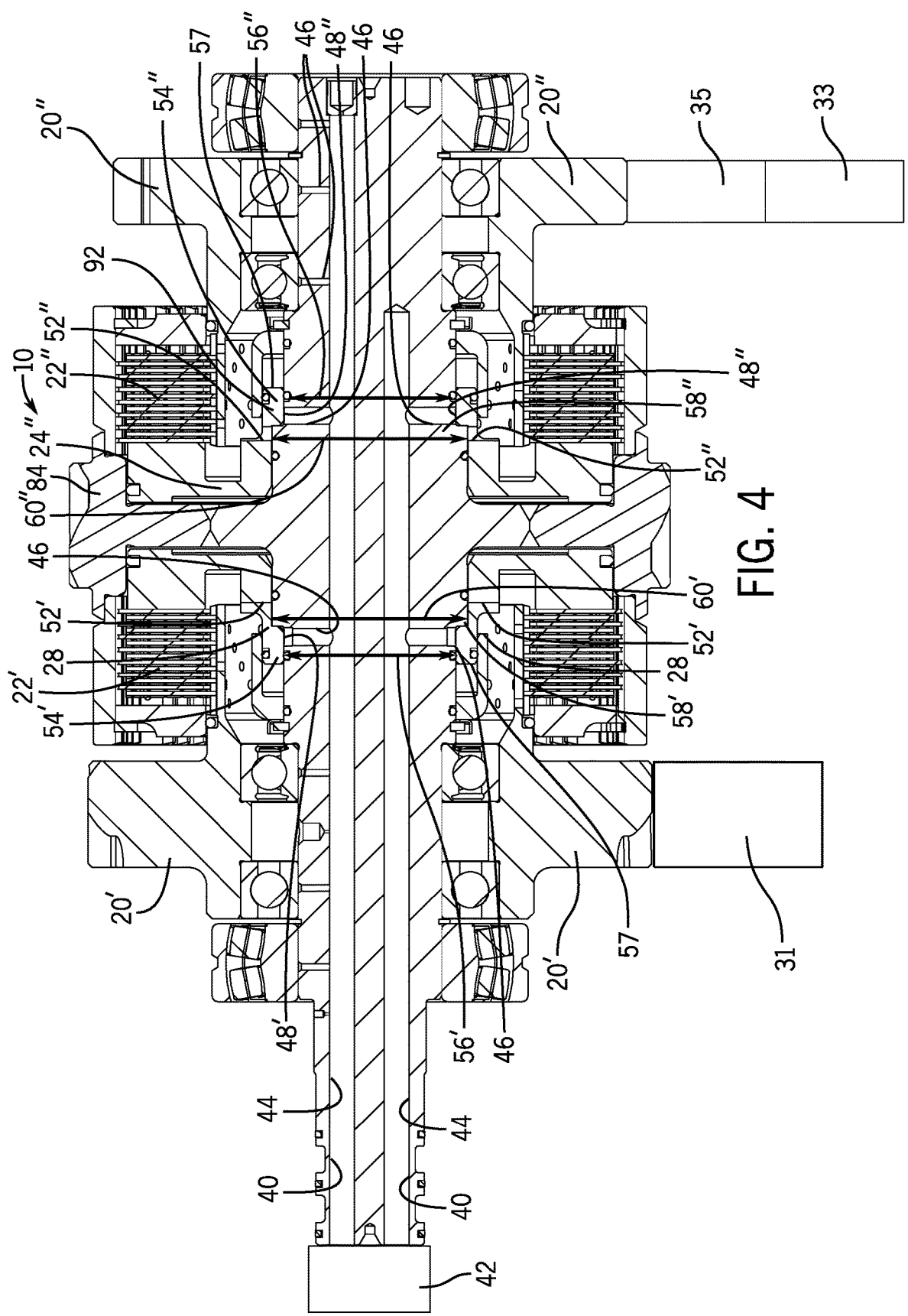
FIG. 4 is a sectional view thereof taken along line 4-4 of FIG. 2.

A first example hydraulic clutch assembly 10 of the present disclosure will be described referring to FIGS. 2-4. Referring to FIG. 2, an isometric view of a first example embodiment of the hydraulic clutch assembly 10 is shown wherein the clutch assembly includes a first clutch 21 and a second clutch 23. FIG. 3 is a sectional view of the hydraulic clutch assembly 10 in FIG. 2 along lines 3-3 of FIG. 2 showing the first and second hydraulic pressure passageways 102, 104. FIG. 4 is a sectional view of the hydraulic clutch assembly 10 of FIG. 2 along lines 4-4 in FIG. 2 showing at least one lubrication passageway 40.

As shown in FIG. 3, the first example hydraulic clutch assembly 10 includes a housing 12 defining an internal cavity 14, a shaft 16, a first clutch pack 22', a first piston 24' and a first cylinder 32'. The shaft 16 extends within the internal cavity 14 along a rotation axis 18 for a first rotatable member 20'. The first clutch pack 22' includes interleaved plates 25 and discs 27 which are configured to rotationally couple the first rotatable member 20' to the shaft 16. The first piston 24' may be disposed within the internal cavity 14 of the housing 12. The first piston 24' includes a first piston region 26 and a second piston region 28. The first piston region 26 is configured to engage the first clutch pack 22' while the second piston region 28 is spaced radially from the first piston region 26. The first piston 24' may be arranged within the housing 12 to define a first pressure chamber 30 between the first piston 24' and the housing 12. As shown in FIG. 3, annular section 98 of the shaft 16 and drive gear 84 may also cooperate with the first piston 24' and the housing 12 to form the first pressure chamber 30. It is understood that drive gear 84 co-rotates with shaft 16 and housing 12 (for first clutch pack 22' and second clutch pack 22").

The first cylinder 32' may be disposed within the internal cavity 14 of the housing 12. The first cylinder 32' may include a first hollow interior 34' for receiving the second piston region 28. The second piston region 28, the first cylinder 32' and the shaft 16 may define a second pressure chamber 36. Hydraulic pressure to the first pressure chamber 30 may drive the first piston 24' axially toward the first clutch pack 22' to apply an engagement force 38 from the first piston 24' to the first clutch pack 22'. In order to remove the engagement force 38 of the first piston 24' from the first clutch pack 22', hydraulic pressure may be applied to the second pressure chamber 36 as the sole means of driving the first piston 24' axially away from the first clutch pack 22'. The first piston region 26 and the second piston region 28 may, but not necessarily, be unitary features of the first piston region 26 with the first piston region 26 defining an annular ring 124 disposed radially outward of and concentric with the second piston region 28. It is understood that the arrangement described above may be implemented in a clutch assembly with a variety of different hydraulic passageways which are defined in the shaft such that the first and second clutches are alternatively engaged or simultaneously engaged. With respect to the example shown in FIGS. 3 and 4, the hydraulic clutch assembly 10' includes hydraulic pressure passageways which are configured to enable alternate engagement of the first and second pistons 24', 24".

Referring to the cross-section of FIG. 4, example lubrication passageways 40 are shown together with lubrication flow passage 52' of the first piston 24' and the lubrication flow passage 52" of the second piston 24". With reference to the first piston 24', the second piston region 28 of the first piston 24' may be annular and disposed about the shaft 16. The second piston region 28 may include an inner annular section 54' with a radial dimension 56' at a distal end 57 of the first piston 24' from the lubrication flow passage 52'. The shaft 16 may include a first shoulder 58' having a radial dimension 60' greater the radial dimension 56' of the inner annular section 54'. The inner annular section 54' of the first piston 24' is configured to abut the shoulder 58' of the shaft 16 when the first clutch pack 22' is disengaged to obstruct communication of the lubrication flow passage 52' and the lubrication shaft opening 48'.

Referring back to FIG. 3, a second piston 24" and a second clutch pack 22" is shown. As shown, a third pressure chamber 94 and a fourth pressure chamber 100 are each defined in part by the second piston 24". In this embodiment, the fourth pressure chamber 100 of the second piston 24" may be in fluid communication with the first pressure chamber 30 of the first piston 24' while the second pressure chamber 36 of the first piston 24' may be in fluid communication with the third pressure chamber 94 of the second piston 24" as later described herein. The fluid communication between the various pressure chambers enables alternate engagement of the first and second clutch packs 22', 22".

As shown in FIG. 3, the second clutch pack 22" similarly includes interleaved plates 25 and discs 27 which are configured to rotationally couple a second rotatable member 20" to the shaft 16. The second piston 24" may be disposed within the internal cavity 14" of the housing 12. This second piston 24" may have a third piston region 90 and a fourth piston region 92 which is spaced radially from the third piston region 90. The third piston region 90 may be configured to engage the second clutch pack 22". The second piston 24" may be arranged within the housing 12 to define the third pressure chamber 94 between the second piston 24" and the housing 12. As shown in FIG. 3, annular section 98 of the shaft 16 and drive gear 84 may also cooperate with the second piston 24" and the housing 12 (of the second piston 24") to form the third pressure chamber 94. As previously noted, it is understood that drive gear 84 co-rotates with shaft 16 and housings 12 (for first clutch pack 22' and second clutch pack 22").

Figure 5A:
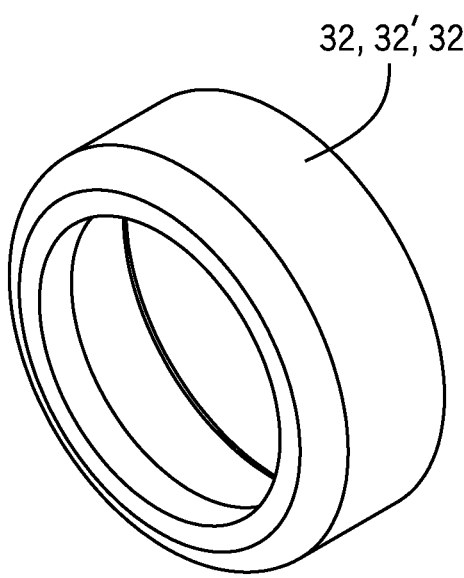
FIGS. 5A and 5B are isometric views of an example cylinder thereof shown in isolation.
Figure 5B:
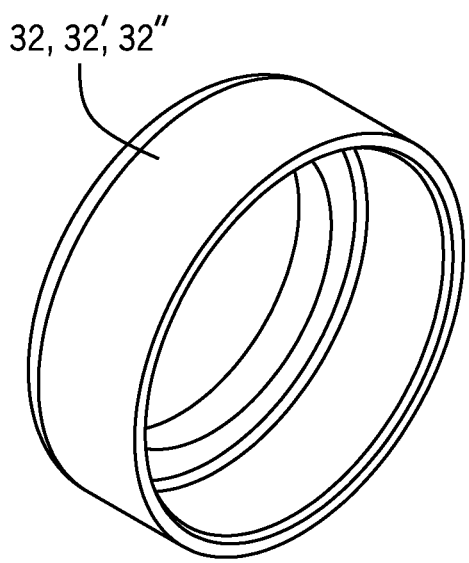

Referring again to FIG. 3, a second cylinder 32" may be disposed within the internal cavity 14 of the housing 12 (for second clutch pack 22") wherein the second cylinder 22" includes a second hollow interior 34" which receives the fourth piston region 92 to define the fourth pressure chamber 100 between the fourth piston region 92 and the second cylinder 32". FIGS. 5A and 5B illustrate isometric views of a cylinder which may, but not necessarily, be either the first cylinder 32' or the second cylinder 32" in the various embodiments of the present disclosure.

Figure 6:
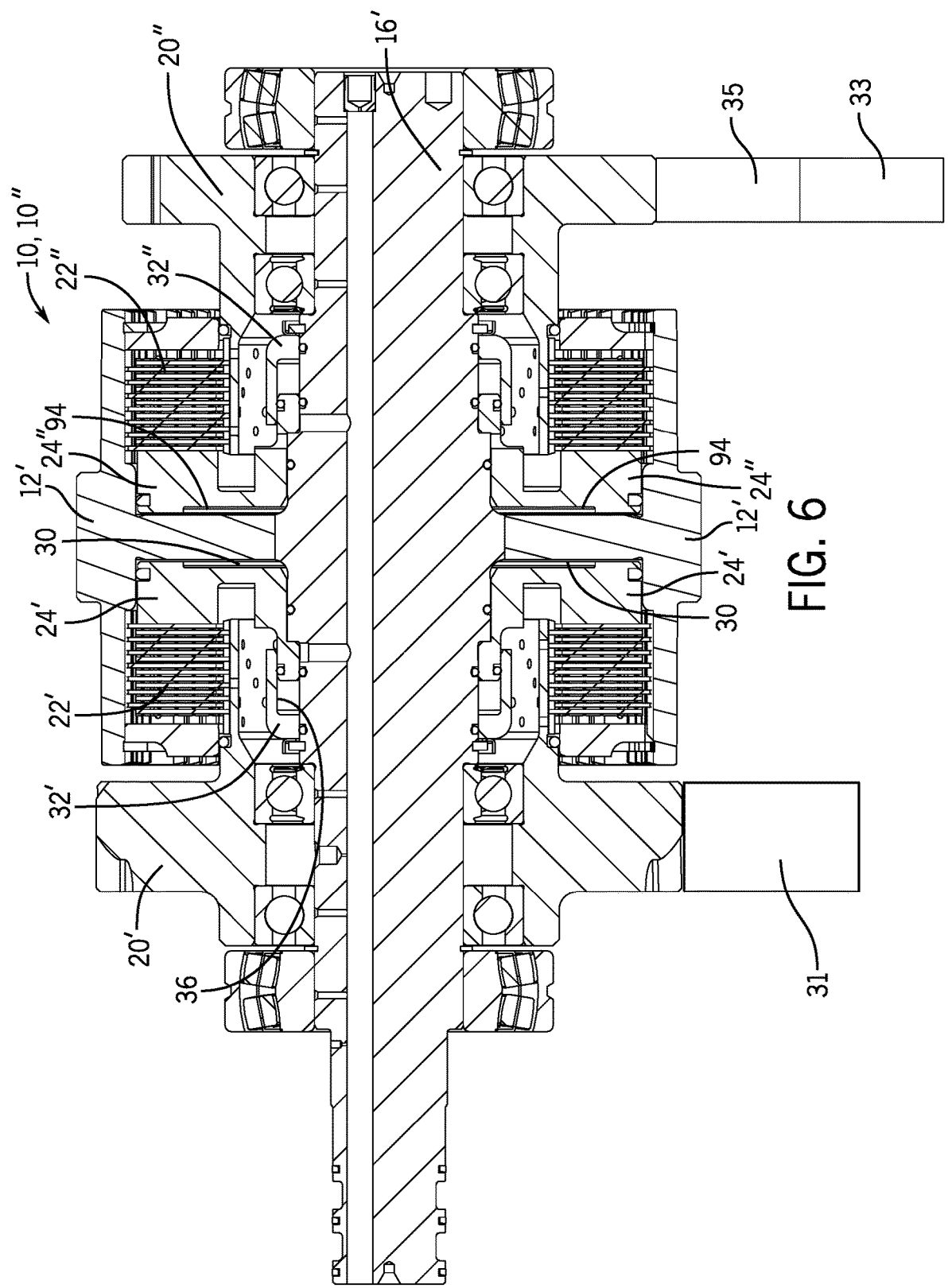
FIG. 6 is a sectional view of another example of the hydraulic clutch assembly similar to the embodiment of FIG. 3.

As shown in FIG. 3, the optional annular section 98 may be disposed axially between the first piston 24' and the second piston 24" and forming, in part, the first pressure chamber 30 and the third pressure chamber 94. Alternatively, as shown in FIG. 6, a single housing 12' may be implemented for both the first clutch pack 22' and the second clutch pack 22" wherein the housing 12' may extend down to the shaft 16' (between the first clutch pack 22' and the second clutch pack 22") such that the shaft 16', the first piston 22', and the housing 12' define the first pressure chamber 30 while the third pressure chamber 94 is defined by the shaft 16', the second piston 22", and the housing 12'.

Referring again to FIG. 4 showing the lubrication passageways 40 for the present embodiment, the fourth piston region 92 may be annular and disposed about the shaft 16. The fourth piston region 92 may include an inner annular section 54" with a radial dimension 56" at a distal end 57 of the second piston 24" from the lubrication flow passage 52". The shaft 16 may include a second shoulder 58" having a radial dimension 60" greater the radial dimension 60" of the inner annular section 54" of the fourth piston region 92. The inner annular section 54" of the fourth piston region 92 is configured abut the second shoulder 58" of the shaft 16 when the second clutch pack 22" is disengaged to obstruct communication of the lubrication flow passage 52" and the lubrication shaft opening 48".

With reference to FIG. 3, the first and second hydraulic pressure passageways 102, 104 may be defined in the shaft 16 wherein each of the first and second hydraulic pressure passageways 102, 104 are configured to be fluidly couple to a hydraulic pressure source 64 which is shared between the first and second hydraulic pressure passageways 102, 104.

As shown, the first hydraulic pressure passageway 102 includes a first axial passage 106 extending along the rotation axis 18, a first radial passage 107, and a fourth radial passage 108. The first radial passage 107 extends perpendicularly to and intersects the first axial passage 106. The first radial passage 107 extends from the first axial passage 106 to a first shaft opening 110 while the fourth radial passage 108 extends from the first axial passage 106 to a fourth shaft opening 112. The first shaft opening 110 and the fourth shaft opening 112 are each defined at a circumferential surface 50 of the shaft 16 wherein the first shaft opening 110 is in communication with the first pressure chamber 30 and the fourth shaft opening 112 is in communication with the fourth pressure chamber 100. Accordingly, the first pressure chamber 30 and the fourth pressure chamber 100 are in communication via the first hydraulic pressure passageway 102.

With reference to FIG. 3, the second hydraulic pressure passageway 104 may include a second axial passage 114 extending along the rotation axis 18, a second radial passage 116, and a third radial passage 118. The second radial passage 116 may be disposed perpendicularly to the second axial passage 114 and may intersect the second axial passage 114. Therefore, as shown, the second radial passage 116 may extend from the second axial passage 114 to a second shaft opening 120. The second shaft opening 120 is in communication with the second pressure chamber 36. The third radial passage 118 may also be disposed perpendicular to the second axial passage 114 and may intersect the second axial passage 114. Thus, the third radial passage 118 may extend from the second axial passage 114 to a third shaft opening 122. The third shaft opening 122 may be in communication with the third pressure chamber 94. Accordingly, the second pressure chamber 36 and the third pressure chamber 94 may be in fluid communication via the second hydraulic pressure passageway 104.

Due to the arrangement of the first and second hydraulic pressure passageways 102, 104 in FIG. 3, the application of pressure to the first hydraulic pressure passageway 102 causes the first piston 24" to engage the first clutch pack 22' and second piston 24" to disengage the second clutch pack 22" while application of pressure to the second hydraulic pressure passageway 104 causes the second piston 24" to engage the second clutch pack 22" and the first piston region 26 to disengage the first clutch pack 22'.

Referring now to FIG. 4, FIG. 4 is a sectional view of the hydraulic clutch assembly 10 of FIG. 2 along lines 4-4 which showing two lubrication passageways 40. In this example, two lubrication passageways 40 may be defined in the shaft 16 and may be fluidly coupled to a lubrication source 42. Each lubrication passageway 40 may further include an axial passage 44 extending along the rotation axis 18 and a radial passage 46. Each radial passage 46 may extend perpendicularly to the associated axial passage 44 wherein the radial passage 46 intersect the associated axial passage 44. Each radial passage 46 may extend from the corresponding axial passage 44 to a lubrication shaft opening 48 at a circumferential surface 50 of the shaft 16. As shown, the first piston 24' and the second piston 24" may each also include a lubrication flow passage 52', 52" which is configured to align with the corresponding lubrication shaft opening 48', 48". Each lubrication flow passage 52', 52" may be configured to allow communication of the corresponding lubrication shaft opening 48', 48" to the internal cavity 14 of the housing 12 when the associated clutch pack is engaged.

A valve 80 may be in communication with the first and second hydraulic pressure lines. This valve supplies pressure oil alternatively to the first and third pressure chambers 30, 94 (via the first and second hydraulic pressure lines) to actuate the first and second pistons 24', 24" respectively. Thus, the first and second clutches (or forward and reverse drive clutches) are alternatively engageable.

In one example, when the valve 80 engages the first clutch 86 and disengages the second clutch 88, the torque of shaft 16 is transmitted to the housing 12 and the first rotatable member 20', thereby driving the work vehicle 11 forward. When the valve 80 disengages the first clutch 86 and engages the second clutch 88, the torque of shaft 16 is transmitted to housing 12 and the second rotatable member 20", thereby driving the work vehicle 11 backward.

Figure 7:
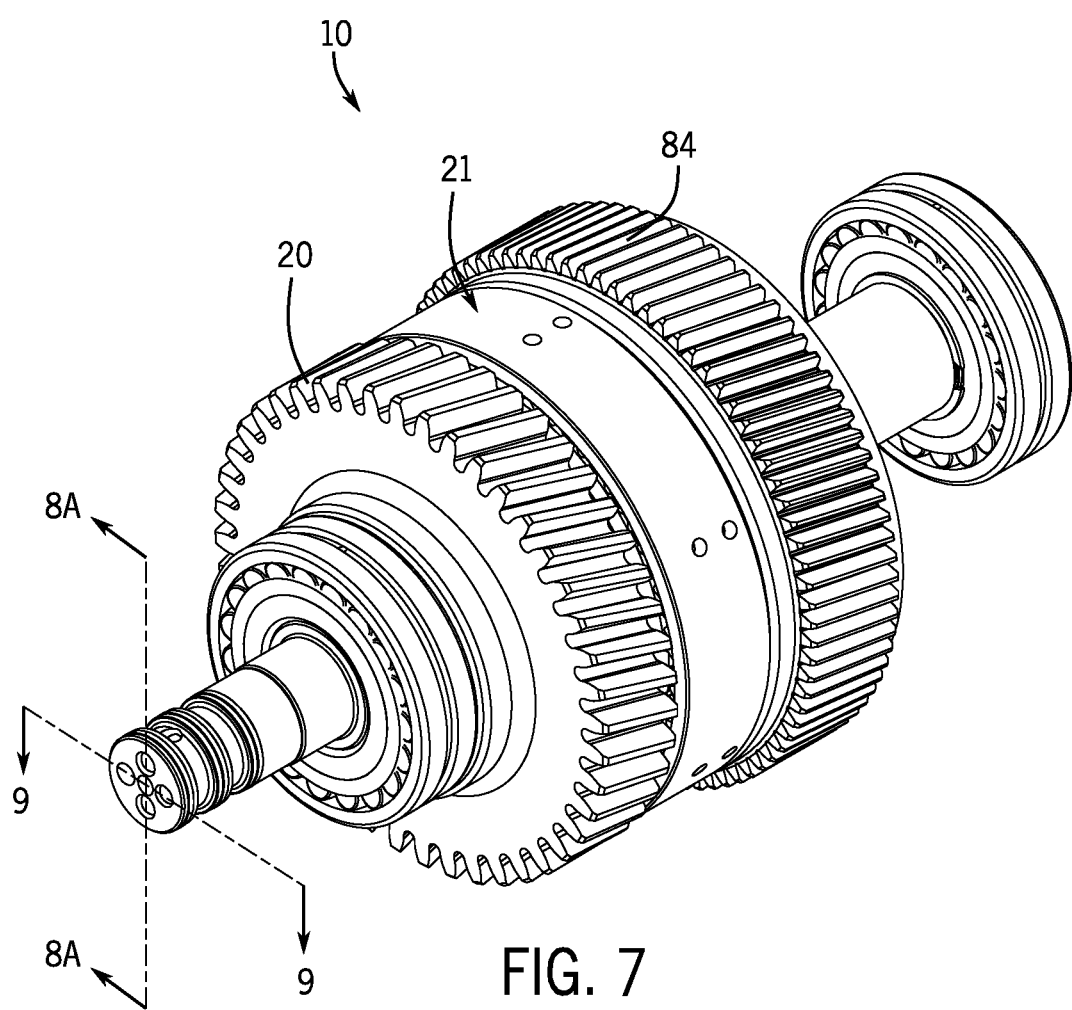
FIG. 7 is an isometric view of another example of the hydraulic clutch assembly of the present disclosure.
Figure 8A:
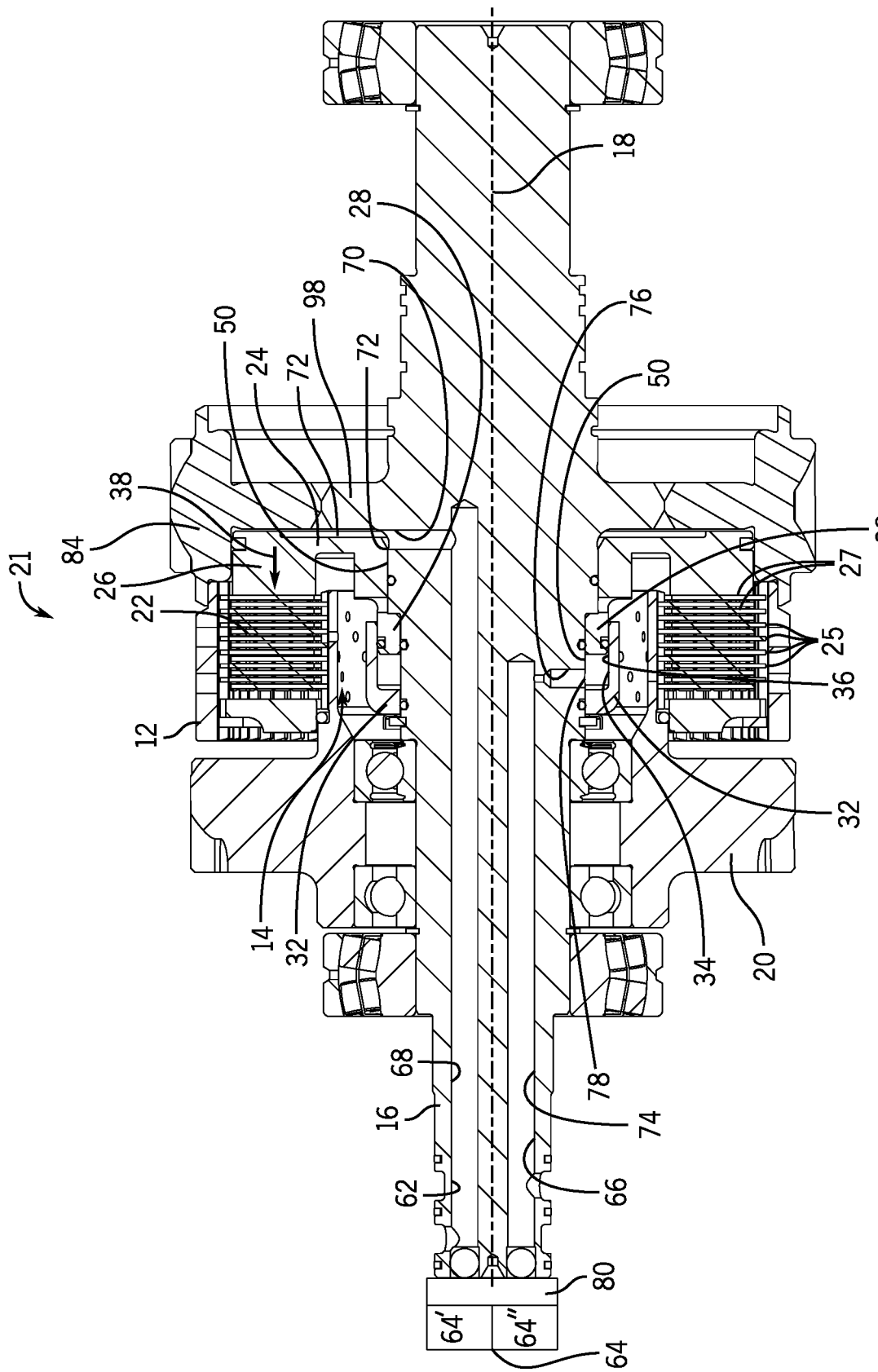
FIG. 8A is a sectional view thereof taken along line 8A-8A of FIG. 7.
Figure 8B:
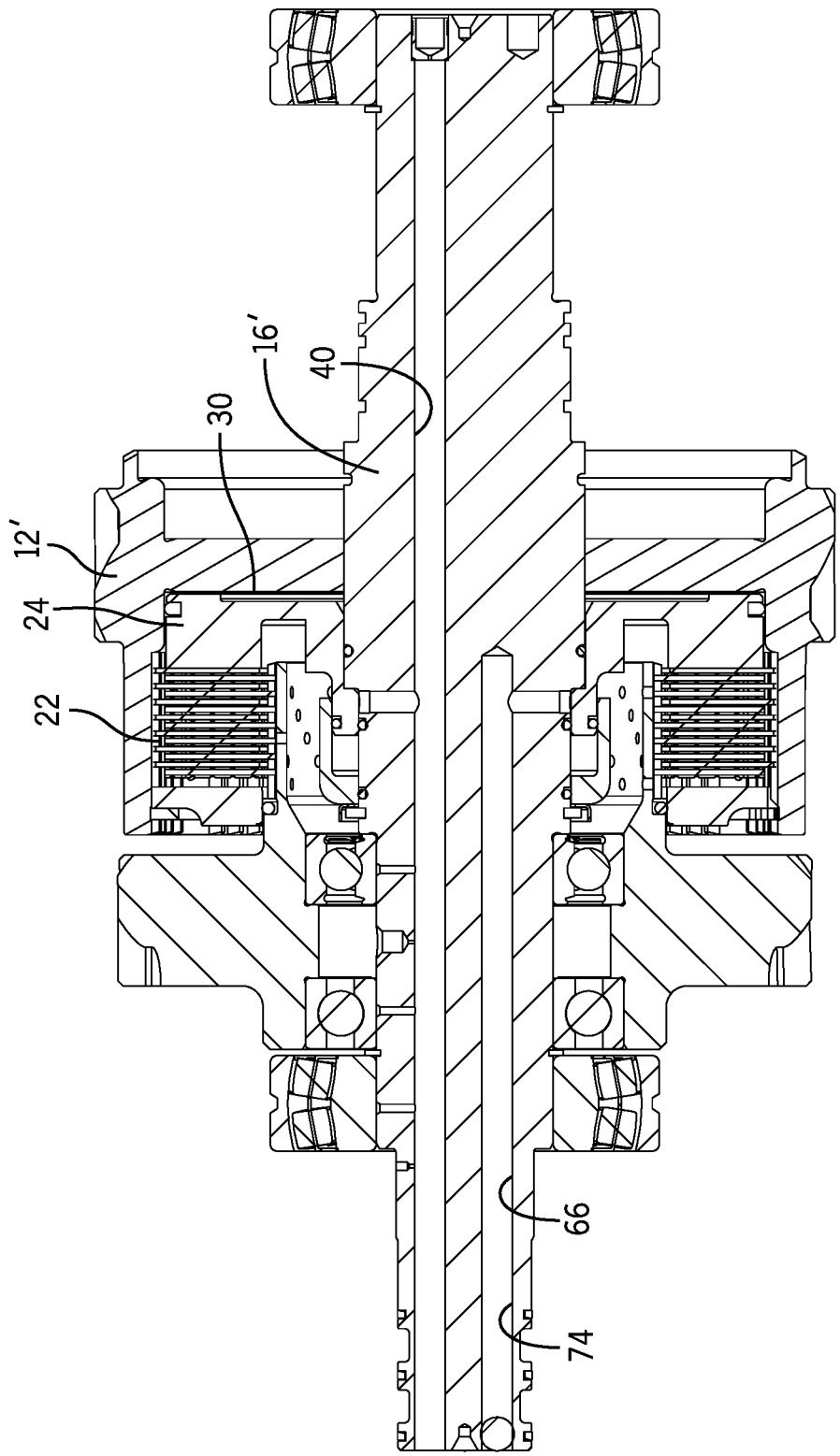
FIG. 8B is sectional view of another example of the hydraulic clutch assembly similar to the embodiment of FIG. 8A.
Figure 9:
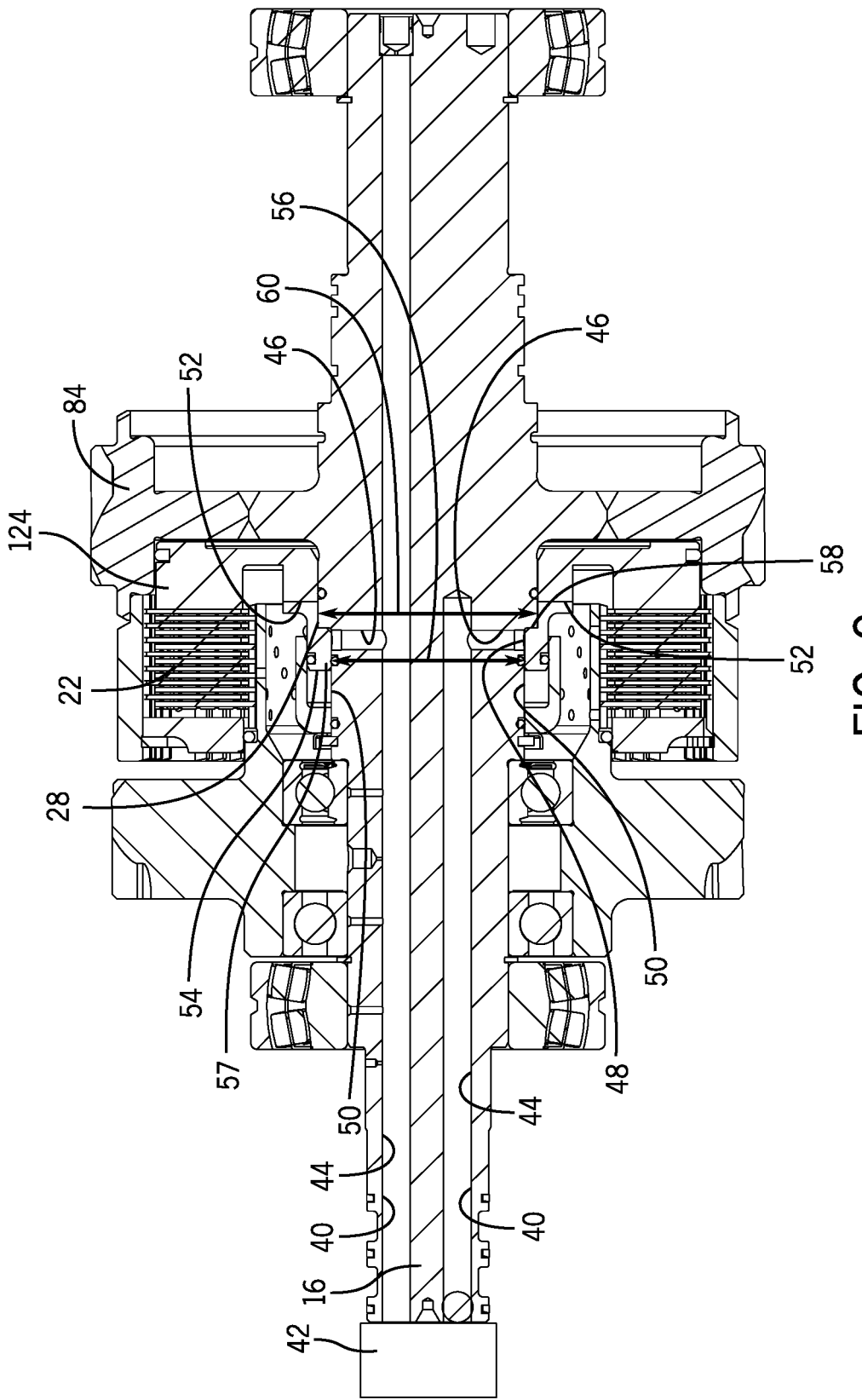
FIG. 9 is a sectional view of the hydraulic clutch assembly of FIG. 7 taken along line 9-9.

Referring now to FIGS. 7-9, another example hydraulic clutch assembly 10' of the present disclosure is shown using one clutch pack. Although, it is understood that multiple clutch packs may be used. In this arrangement, the first pressure chamber 30 and the second pressure chamber 36 may be in fluid communication with separate pressure sources wherein the second pressure chamber 36 is maintained at a constant pressure.

With reference to FIG. 8A, a sectional view of the hydraulic clutch assembly 10' in FIG. 7 is provided along lines 8A-8A of FIG. 7 to show the first and second hydraulic pressure passageways 62, 66. As shown, this example hydraulic clutch assembly 10' may include a housing 12 defining an internal cavity 14, a shaft 16, a clutch pack 22, a piston 24 and a cylinder 32. The shaft 16 extends within the internal cavity 14 along a rotation axis 18 for a rotatable member 20. The clutch pack 22 includes interleaved plates 25 and discs 27 which may rotationally couple the rotatable member 20 to the shaft 16. The piston 24 may be disposed within the internal cavity 14 of the housing 12. The piston 24 includes a first piston region 26 and a second piston region 28. The first piston region 26 is configured to engage the clutch pack 22 while the second piston region 28 is spaced radially from the first piston region 26. The piston 24 may be arranged within the housing 12 to define a first pressure chamber 30 between the piston 24 and the housing 12. It is further understood that a drive gear 84 may be provided which engages with the housing 12 and annular section 98 of input shaft 16 so that the drive gear 84, piston 24, housing 12 and shaft 16 define the first pressure chamber 30. Alternatively, with reference to FIG. 8B, the housing 12' may extend down to the input shaft 16' (with no drive gear provided) and abut the input shaft 16' so that the housing 12', piston 24 and shaft 16' define the first pressure chamber 30. Housing 12' co-rotates with the shaft 16'. While one clutch pack 22 is shown in FIGS. 8A, 8B, and 9, it is understood that any number of clutch packs may be implemented in this embodiment.

A cylinder 32 may be disposed within the internal cavity 14 of the housing 12 and may include a first hollow interior 34 for receiving the second piston region 28. The second piston region 28 and the cylinder 32 may define a second pressure chamber 36. Hydraulic pressure to the first pressure chamber 30 may drive the piston 24 axially toward the clutch pack 22 to apply an engagement force 38 from the first piston region 26 to the clutch pack 22. In order to remove the engagement force 38 of the first piston region 26 from the clutch pack 22, hydraulic pressure may be applied to the second pressure chamber 36 as the sole means of driving the piston 24 axially away from the clutch pack 22. The first piston region 26 and the second piston region 28 may, but not necessarily, be unitary features of the piston 24 with the first piston region 26 defining an annular ring 124 disposed radially outward of and concentric with the second piston region 28.

With reference to FIG. 9 showing the lubrication passageways 40 of hydraulic clutch assembly 10', the second piston region 28 may be annular and disposed about the shaft 16. The second piston region 28 may include an inner annular section 54 with a radial dimension 56 at a distal end of the piston 24 from the lubrication flow passage 52. The shaft 16 may include a shoulder 58 having a radial dimension 60 greater the radial dimension 56 of the inner annular section 54. The inner annular section 54 of the piston 24 is configured abut the shoulder 58 of the shaft 16 when the clutch pack 22 is disengaged to obstruct communication of the lubrication flow passage 52 and the lubrication shaft opening 48.

Referring again to FIG. 8A, the first hydraulic pressure passageway 62 and the second hydraulic pressure passageway 66 may be fluidly coupled to separate hydraulic pressure sources 64', 64". Under this arrangement, the first hydraulic pressure passageway 62 is defined in the shaft 16 and is configured to fluidly couple to a first hydraulic pressure source 64' while the second hydraulic pressure passageway 66 is also defined in the shaft 16 and is configured to couple to a second hydraulic pressure source 64". The second hydraulic pressure source 64" may be kept at a constant pressure that is lower that a maximum pressure of the first hydraulic pressure source 64'. Accordingly, in order to engage the clutch pack 22, the first hydraulic pressure source 64' increases the pressure in the first pressure chamber 30 (via the first hydraulic pressure passageway 62) to exceed the constant pressure provided in in the second hydraulic passageway 66 and/or second pressure chamber 36. A control valve 80 (such as an electro-hydraulic proportional solenoid valve) coupled to the first hydraulic pressure source 64' may, for example, be implemented to achieve this increased pressure in the first hydraulic pressure passageway 62 and first pressure chamber 30. Upon disengagement of the clutch pack 22, the control valve 80 may decrease the pressure in the first pressure chamber 30 to a level which is lower than the constant pressure maintained in the second pressure chamber 36 and/or second hydraulic passageway 66.

Referring to again FIG. 8A, alternatively, the first hydraulic pressure passageway 62 and the second hydraulic pressure passageway 66 may be configured to fluidly couple to the same hydraulic pressure source 64 wherein a control valve 80 is implemented at the hydraulic pressure source 64 to alternately deliver hydraulic fluid pressure to either the first pressure chamber 30 (via the first hydraulic pressure passageway 62) or the third pressure chamber 36 (via the second hydraulic pressure passageway 66). It is understood that the embodiment of FIGS. 8A, 8B and 9 may be implemented with any number of clutch packs.

In the example shown in FIG. 8A, the first hydraulic pressure passageway 62 may include a first axial passage 68 extending along the rotation axis 18 and a first radial passage 70. The first radial passage 70 is perpendicular to and intersects the first axial passage 68. The first radial passage 70 extends from the first axial passage 68 to first pressure chamber 30 via to a first shaft opening 72 at a circumferential surface 50 of the shaft 16. The second hydraulic pressure passageway 66 includes a second axial passage 74 extending along the rotation axis 18 and a second radial passage 76. The second radial passage 76 is perpendicular to and intersects the second axial passage 74. The second radial passage 76 extends from the second axial passage 74 to second pressure chamber 36 via to a second shaft opening 78 at a circumferential surface 50 of the shaft 16.

FIG. 9 is an example sectional view of the hydraulic clutch assembly 10' of FIG. 7 along lines 8-8 which shows two lubrication passageways 40 implemented in the hydraulic clutch assembly 10" of FIG. 7. However, any number of lubrication passageways 40 may be implemented. As shown in FIG. 9, lubrication passageways 40 may be defined in the shaft 16 and may be configured to fluidly couple to at least one lubrication source 42. As shown, each lubrication passageway 40 may further include at least one radial passage 46 and an axial passage 44 extending along the rotation axis 18. As shown, each radial passage 46 may extend perpendicularly to the corresponding axial passage 44 so as to intersect the corresponding axial passage 44. Thus, each radial passage 46 may extend from the axial passage 44 to a lubrication shaft opening 48 at a circumferential surface 50 of the shaft 16. The piston 24 may also include a lubrication flow passage 52 which is configured to align with the lubrication shaft opening 48. This lubrication flow passage 52 may be defined in the second piston region 28 as shown. The lubrication flow passage 52 may be configured to allow communication of the lubrication shaft opening 48 to the internal cavity 14 of the housing 12 when the clutch pack 22 is engaged.

Figure 10:
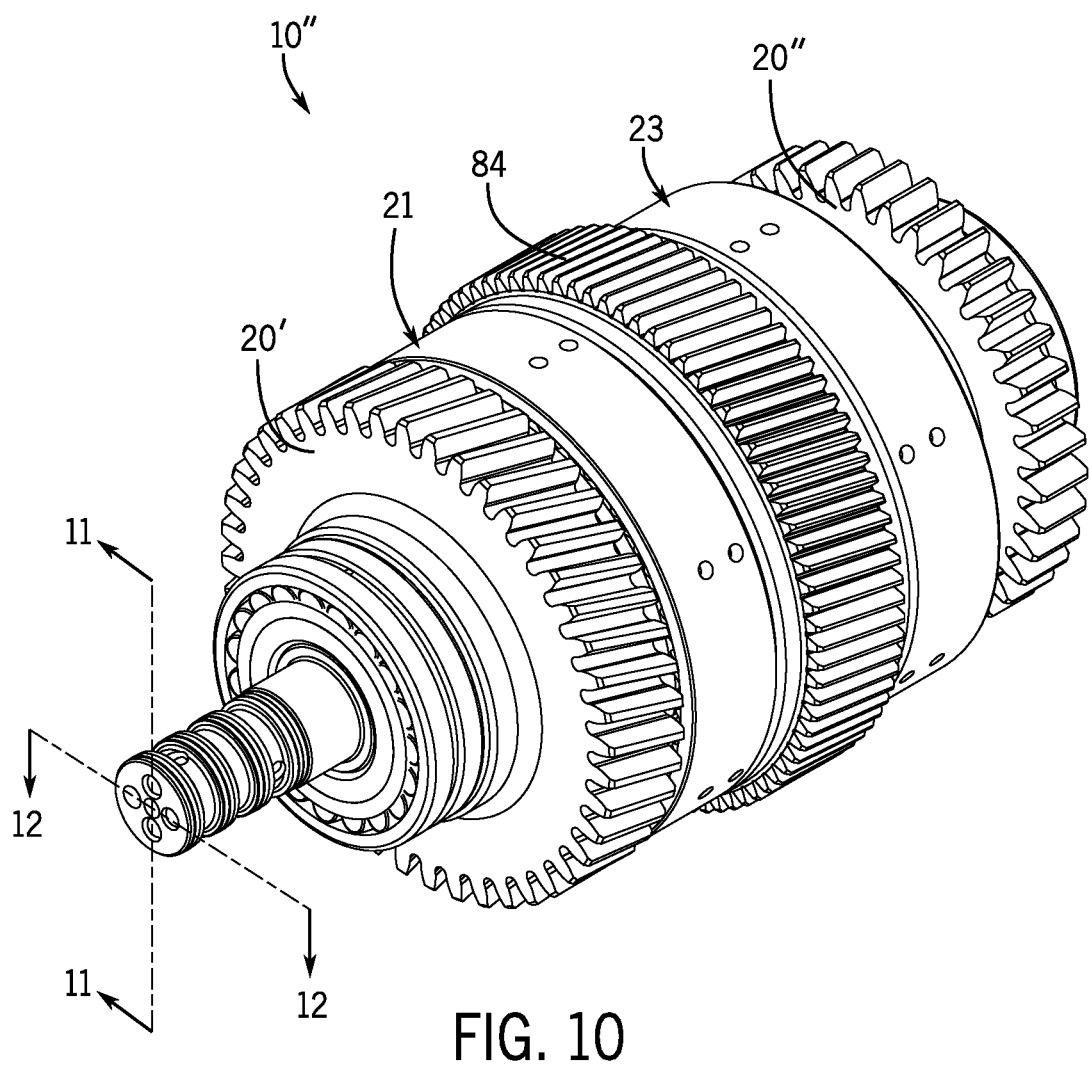
FIG. 10 is an isometric view of another example of the hydraulic clutch assembly of the present disclosure.
Figure 11:
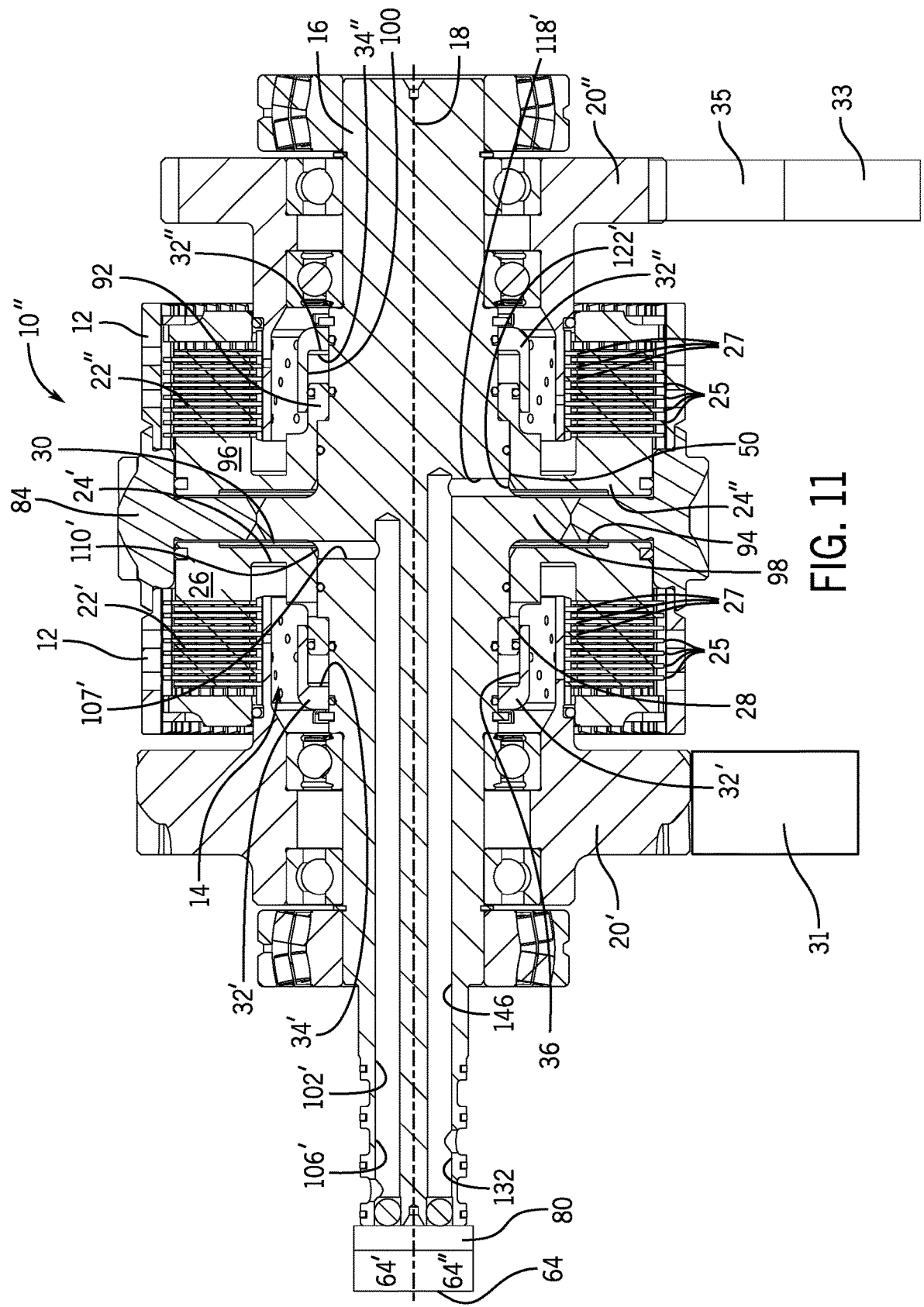
FIG. 11 is a sectional view thereof taken along line 11-11 of FIG. 10.
Figure 12:
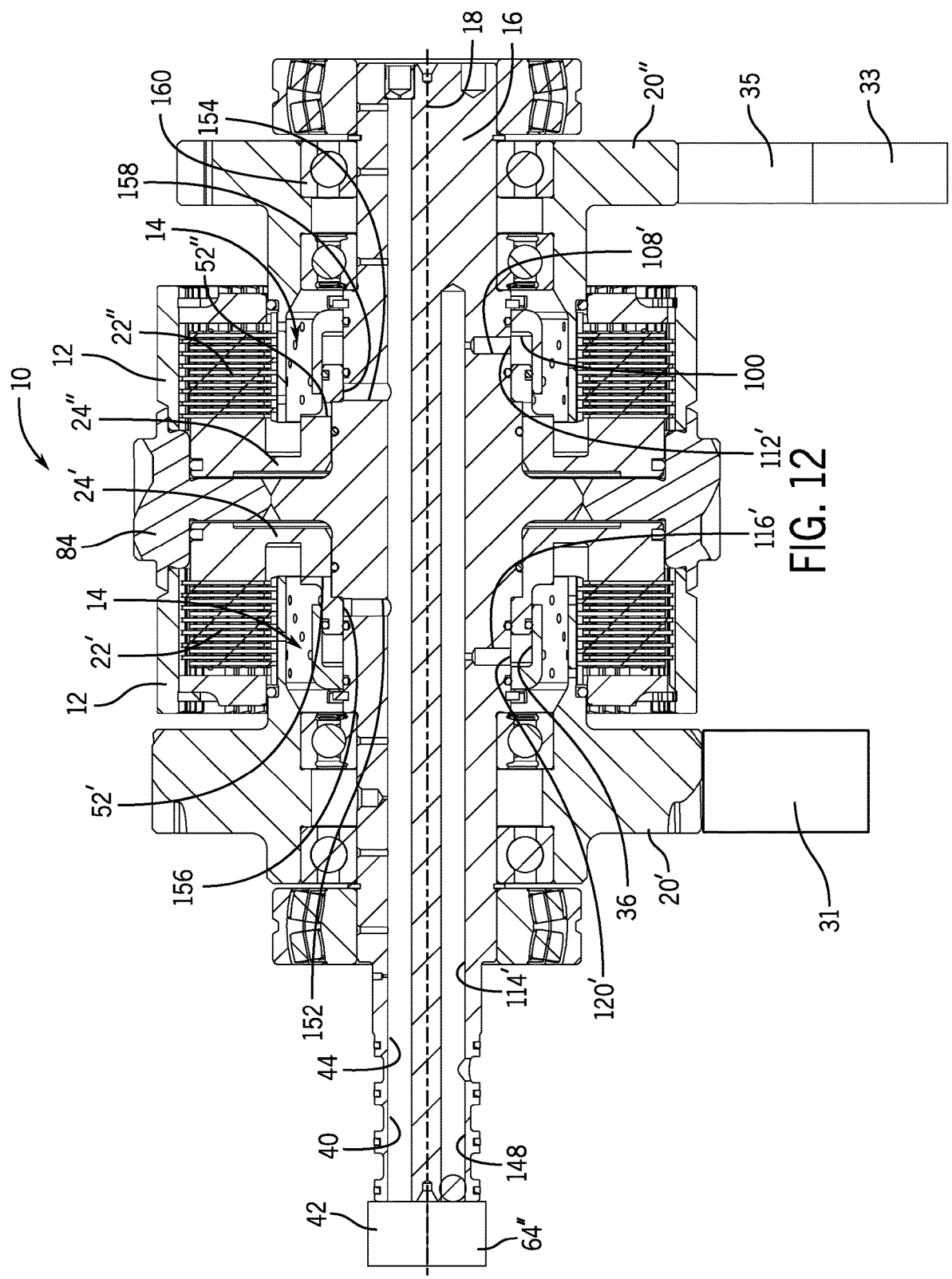
FIG. 12 is a sectional view thereof taken along line 12-12 of FIG. 10.

Referring now to FIGS. 10-12, another example of the hydraulic clutch assembly 10" is shown. FIG. 10 is an isometric view of this hydraulic clutch assembly 10" having two clutches 21, 23. As shown in FIG. 11, this example hydraulic clutch assembly 10" includes three hydraulic pressure passageways 102, 146, 148 (see FIGS. 11-12) as described herein. Referring to FIG. 11, a sectional view of this hydraulic clutch assembly 10'" is shown wherein a first hydraulic pressure passageway 102' is dedicated to the first pressure chamber 30, a third hydraulic pressure passageway 146 is dedicated to the third pressure chamber 94, and a fourth hydraulic pressure passageway 148 is dedicated to both the second pressure chamber 36 and the fourth pressure chamber 100. In this embodiment, the second and fourth pressure chambers 36, 100 are maintained at a constant pressure.

As shown in FIG. 11, this example hydraulic clutch assembly 10" includes a shaft 16, a first clutch pack 22', a first piston 24', a first cylinder 32', a second clutch pack 22", a second piston 24", and a second cylinder 32" as well as housing 12 for each clutch pack 22', 22" defining an internal cavity 14. The shaft 16 may extend within the internal cavity 14 along a rotation axis 18 for rotating a first rotatable member 20' and a second rotatable member 20". The first clutch pack 22' may include interleaved plates 25 and discs 27 which are configured to rotationally couple the first rotatable member 20' to the shaft 16. The first piston 24' may be disposed within the internal cavity 14 of the housing 12 about the shaft 16. The first piston 24' may include a first piston region 26 and a second piston region 28 spaced radially from the first piston region 26. The first piston region 26 may engage the first clutch pack 22'. The first cylinder 32' may be disposed within the internal cavity 14 of the housing 12 about the shaft 16. The first cylinder 32' includes a first hollow interior 34' receiving the second piston region 28 to define a second pressure chamber 36 between the second piston region 28 and the first cylinder 32'.

As shown in FIG. 11, the first piston 24' may be arranged within the housing 12 to define a first pressure chamber 30 between the first piston 24' and the housing 12. An optional annular section 98 may be provided which is integral to the shaft 16 and may be configured to co-rotate with the shaft 16. This optional annular section 98 may be disposed axially between the first piston 24' and the second piston 24". Thus, as shown in FIG. 11, optional annular section 98, drive gear 84, housing 12, first piston 24' and shaft 16 may define the first pressure chamber 30 while optional annular section 98, drive gear 84, housing 12, first piston 24' and shaft 16 may define the third pressure chamber 94. Alternatively, with reference to FIG. 6, hydraulic clutch assembly 10" may implement a housing 12' which abuts the shaft 16' (between the first clutch pack 22' and the second clutch pack 22") such that the shaft 16', the first piston 24', and the housing 12' define the first pressure chamber 30 while the third pressure chamber 94 is defined by the shaft 16', the second piston 24", and the housing 12'.

In this example embodiment, the second clutch pack 22" includes interleaved plates 25 and discs 27 which are configured to rotationally couple a second rotatable member 20" to the shaft 16. The second piston 24" may also be disposed within the internal cavity 14 of the housing 12. The second piston 24" includes a third piston region 90 and a fourth piston region 92 spaced radially from the third piston region 90. The third piston region 90 may be configured to engage the second clutch pack 22". The second piston 24" may be arranged within the housing 12 to define a third pressure chamber 94 between the second piston 24" and the housing 12. The second cylinder 32" may also be disposed within the internal cavity 14 of the housing 12. The second cylinder 32" defines a second hollow interior 34" which receives the fourth piston region 92. As shown in FIG. 11, the fourth pressure chamber 100 may defined between the fourth piston region 92 and the second cylinder 32".

In this embodiment, a first hydraulic pressure passageway 102' may also be defined in the shaft 16 where the first hydraulic pressure passageway 102' may fluidly couple the first pressure chamber 30 to a hydraulic pressure source 64. With respect to the third pressure chamber 94, a third hydraulic pressure passageway 146 may be defined in the shaft 16 where the third hydraulic pressure passageway 146 may be configured to couple the third pressure chamber 94 to the same hydraulic pressure source 64. A valve 80 may be implemented at the pressure source 64 to alternatively deliver fluid pressure to either the first hydraulic pressure passageway 102' (and the first pressure chamber 30) or the third hydraulic pressure passageway 146 (and the third pressure chamber 94). Alternatively, the first and third hydraulic pressure passageways 102', 146 may be fluidly coupled to separate hydraulic pressure sources 64', 64" wherein the first hydraulic pressure passageway 102' fluidly couples the first pressure chamber 30 to a first hydraulic pressure source 64 and the third hydraulic pressure passageway 146 fluidly couples the third pressure chamber 94 to a second hydraulic pressure source 64".

Regardless of whether separate or shared pressure source (s) are implemented, the first hydraulic pressure passageway 102' of this embodiment may optionally include a first axial passage 106' extending along the rotation axis 18 and a first radial passage 107'. The first radial passage 107' may be perpendicular to and may intersect the first axial passage 106' so that the first radial passage 107' extends from the first axial passage 106' to a first shaft opening 110' at a circumferential surface 50 of the shaft 16 which is, in turn, in communication with the first pressure chamber 30. The third hydraulic pressure passageway 146 may optionally include a third axial passage 132 extending along the rotation axis 18 and a third radial passage 118'. The third radial passage 118' may be perpendicular to and may intersect the third axial passage 132 so that the third radial passage 118' extends from the third axial passage 132 to a third shaft opening 122' at a circumferential surface 50 of the shaft 16 which is, in turn, in communication with the third pressure chamber 94.

As shown in FIG. 12, a cross sectional view of hydraulic clutch assembly 10" is provided where the fourth hydraulic passageway 148 and lubrication passageway 40 are shown. The fourth hydraulic pressure passageway 148 may be defined in the shaft 16 where the fourth hydraulic pressure passageway 148 couples second and fourth pressure chambers 36, 100 to a third hydraulic pressure source 64'". In this arrangement, the second and fourth pressure chambers 36, 100 may be maintained at a constant pressure via the third hydraulic pressure source 64'" wherein the constant pressure in the second and fourth pressure chambers 36, 100 is lower than the maximum pressure achieved in first and/or third pressure chambers 30, 94.

Referring to FIG. 12, a lubrication passageway 40 may also be defined in the shaft 16 wherein the lubrication passageway 40 fluidly couples a lubrication source 42, a first lubrication shaft opening 156, and a second lubrication shaft opening 158. The lubrication passageway 40 may, but not necessarily, include first and second lubrication radial passages 152, 154 and an axial passage 44 extending along the rotation axis 18. The first lubrication radial passage 152 may be perpendicular to and may intersect the axial passage 44 so that the first lubrication radial passage 152 extends from the axial passage to a first lubrication shaft opening 156 at the circumferential surface 50 of the shaft 16 while the second lubrication radial passage 154 may be perpendicular to and may intersect the axial passage 44 so that the second lubrication radial passage 154 extends from the axial passage 44 to a second lubrication shaft opening 158 at the circumferential surface 50 of the shaft 16.

It is understood that the first lubrication shaft opening 156 may be proximate the first piston 24' while the second lubrication shaft opening 158 may be proximate the second piston 24". The first piston 24' may also further include a first lubrication flow passage 52' which is configured to align with the first lubrication shaft opening 156. The first lubrication flow passage 52' allows communication of the first lubrication shaft opening 156 to the internal cavity 14 of the housing 12 when the first clutch pack 22' is engaged. The second piston 24" may also further include a second lubrication flow passage 52" which is configured to align with the second lubrication shaft opening 158. The second lubrication flow passage 52" allows communication of the second lubrication shaft opening 158 to the internal cavity 14 of the housing 12 when the second clutch pack 22" is engaged. It is understood that the bearings 160 may also be in communication axial passage 44 of lubrication passageway 40. Again, similar to the previous examples of the present disclosure, the hydraulic clutch assembly 10" of FIGS. 11 and 12 may be implemented with any number of clutch packs.

With reference to FIGS. 3, 6, 8A, 8B, 11 and 12, it is understood that each first rotatable member 20' may be meshed with a first gear 31. The second rotatable member 20" (FIGS. 3, 6, 11 and 12) may be meshed with the second gear 33 through a reversing gear 35. The shaft 16, 16' may further carry and co-rotate with at least one clutch housing 12, 12' (see FIGS. 6 and 8B) which co-rotates with the shaft 16, 16'. In the examples shown in FIGS. 3 and 11, two housings 12 are shown with a drive gear 84 disposed in between the two housings 12 wherein the drive gear 84 abuts annular section 98. Annular section 98 is integral to the shaft 16. Alternatively, as shown in FIG. 6, the first clutch pack 22' and the second clutch pack 22″ may be disposed within one clutch housing 12′ if the shaft 16 is driven by the engine at an end of the shaft 16′ (vs. the drive gear 84 of FIGS. 3 and 11).

Regardless of the housing configuration, the first rotatable member 20′ may be actuated by the first piston 24′ via a wet, forward drive multi-disc friction clutch 86 mounted between housing 12, 12′ and the first rotatable member 20′. Similarly, the second rotatable member 20″ for hydraulic clutch assembly 10, 10″ may be actuated by a second piston 24″ via a wet, backward drive multi-disc friction clutch 88 mounted between clutch body and the second rotatable member 20″. The first and third pressure chambers 30, 94 may be defined by at least the housing 12, 12′ and the first and second pistons 24′, 24″ respectively.

Enumerated Examples of Dual-Acting Piston Hydraulic Clutch Assemblies

The following examples of intelligent work vehicle preheating systems are further provided and numbered for ease of reference.

1. In an example embodiment, a hydraulic clutch assembly for a work vehicle includes a housing defining an internal cavity, a shaft, a clutch pack, a piston, and a cylinder. The shaft extends within the internal cavity along a rotation axis for rotating a rotatable member. The clutch pack includes a plurality of interleaved plates and discs which are configured to rotationally couple the rotatable member to the shaft. The piston may be disposed within the internal cavity of the housing. The piston includes a first piston region and a second piston region spaced radially from the first piston region. The first piston region is configured to engage the clutch pack. The piston is arranged within the housing to define a first pressure chamber between the piston and the housing. The cylinder is disposed within the internal cavity of the housing and includes a hollow interior which receives the second piston region to define a second pressure chamber between the second piston region and the cylinder. Application of hydraulic pressure to the first pressure chamber drives the piston axially toward the clutch pack to apply an engagement force from the first piston region to the clutch pack. Application of hydraulic pressure to the second pressure chamber drives the piston axially away from the clutch pack to remove the engagement force of the first piston region from the clutch pack solely with hydraulic pressure.

2. The hydraulic clutch assembly of example 1, further includes a lubrication passageway defined in the shaft. The lubrication passageway is configured to fluidly couple to a lubrication source. The lubrication passageway extends along the rotation axis while a radial passage extends perpendicularly to the lubrication passageway. The lubrication passageway intersects the axial passage and extends to a lubrication shaft opening at a circumferential surface of the shaft. The piston includes a lubrication flow passage which is configured to align with the lubrication shaft opening and which allows communication of the lubrication shaft opening the internal cavity of the housing when the clutch pack is engaged.

3. The hydraulic clutch assembly of example 2, wherein the second piston region is annular and disposed about the shaft. The second piston region includes an inner annular section with a radial dimension at a distal end of the piston from the lubrication flow passage. The shaft includes a shoulder having a radial dimension greater the radial dimension of the inner annular section. The inner annular section is configured to abut the shoulder of the shaft when the clutch pack is disengaged to obstruct communication of the lubrication flow passage and the lubrication shaft opening.

4. The hydraulic clutch assembly of example 1, further including a first hydraulic pressure passageway and a second hydraulic pressure passageway. The first hydraulic pressure passageway is defined in the shaft and is configured to fluidly couple to a hydraulic pressure source. The second hydraulic pressure passageway is defined in the shaft and is configured to couple to the hydraulic pressure source.

5. The hydraulic clutch assembly of example 4, wherein the first hydraulic pressure passageway includes a first axial passage extending along the rotation axis and a first radial passage extending perpendicularly to and intersecting the first axial passage. The first radial passage extends to a first shaft opening at a circumferential surface of the shaft in communication with the first pressure chamber. The second hydraulic pressure passageway includes a second axial passage extending along the rotation axis and a second radial passage extending perpendicularly to and intersecting the second axial passage. The second radial passage extends to a second shaft opening at the circumferential surface of the shaft in communication with the second pressure chamber.

6. The hydraulic clutch assembly of example 5, further including a control valve configured to selectively couple the hydraulic pressure source to either the first hydraulic pressure passageway or the second hydraulic pressure passageway.

7. The hydraulic clutch assembly of example 1, further includes a first hydraulic pressure passageway defined in the shaft wherein the first hydraulic pressure passageway is configured to fluidly couple to a first hydraulic pressure source. The second hydraulic pressure passageway is defined in the shaft and is configured to couple to a second hydraulic pressure source.

8. The hydraulic clutch assembly of example 7, wherein the second hydraulic pressure source is at a constant pressure that is lower that a maximum pressure of the first hydraulic pressure source.

9. The hydraulic clutch assembly of example 7, wherein the first hydraulic pressure passageway includes a first axial passage extending along the rotation axis and a first radial passage extending perpendicularly to and intersecting the first axial passage and extending to a first shaft opening at a circumferential surface of the shaft in communication with the first pressure chamber. The second hydraulic pressure passageway includes a second axial passage extending along the rotation axis. A second radial passage extends perpendicularly to the second axial passage and intersects the second axial passage. The second radial passage extends to a second shaft opening at the circumferential surface of the shaft in communication with the second pressure chamber.

10. The hydraulic clutch assembly of example 1, wherein the clutch pack is a first clutch pack and the piston is a first piston. The hydraulic clutch assembly further includes a second clutch pack, a second piston, and a second cylinder. The second clutch pack includes a plurality of interleaved plates and discs which are configured to rotationally couple a second rotatable member to the shaft. The second piston is disposed within the internal cavity of the housing. The second piston includes a third piston region configured to engage the second clutch pack and a fourth piston region spaced radially from the third piston region. The second piston is arranged within the housing to define a third pressure chamber between the second piston and the housing. The second cylinder is disposed within the internal cavity of the housing and has a hollow interior receiving the fourth piston region to define a fourth pressure chamber between the fourth piston region and the second cylinder.

11. The hydraulic clutch assembly of example 10, further including a first hydraulic pressure passageway and a second hydraulic pressure passageway. The first hydraulic pressure passageway is defined in the shaft and is configured to fluidly couple to a hydraulic pressure source. The second hydraulic pressure passageway is defined in the shaft and is configured to couple to the hydraulic pressure source.

12. The hydraulic clutch assembly of example 11, wherein the first hydraulic pressure passageway includes a first axial passage extending along the rotation axis and a first radial passage and a fourth radial passage extending perpendicularly to and intersecting the first axial passage and extending to a first shaft opening and a fourth shaft opening, respectively, at a circumferential surface of the shaft, the first shaft opening being in communication with the first pressure chamber and the fourth shaft opening being in communication with the fourth pressure chamber. The second hydraulic pressure passageway includes a second axial passage extending along the rotation axis and a second radial passage and a third radial passage extending perpendicularly to and intersecting the second axial passage and extending to a second shaft opening and a third shaft opening, respectively, the second shaft opening being in communication with the second pressure chamber and the third shaft opening being in communication with the third pressure chamber.

13. In another example embodiment, a hydraulic clutch assembly for a work vehicle includes a housing defining an internal cavity, a shaft, a clutch pack, a piston, and a cylinder. The shaft extends within the internal cavity along a rotation axis for rotating rotatable member. The clutch pack includes a plurality of interleaved plates and discs and is configured to rotationally couple the rotatable member to the shaft. The piston is disposed within the internal cavity of the housing about the shaft. The piston includes a first piston region and a second piston region spaced radially from the first piston region. The first piston region is configured to engage the clutch pack. The piston is arranged within the housing to define a first pressure chamber between the piston and the housing. The cylinder is disposed within the internal cavity of the housing about the shaft and includes a hollow interior which receives the second piston region to define a second pressure chamber between the second piston region and the cylinder. Application of hydraulic pressure to the first pressure chamber drives the piston axially toward the clutch pack to apply an engagement force from the first piston region to the clutch pack. Application of hydraulic pressure to the second pressure chamber drives the piston axially away from the clutch pack to remove the engagement force of the first piston region from the clutch pack solely with hydraulic pressure.

14. The hydraulic clutch assembly of example 13, further includes a first hydraulic pressure passageway and a second hydraulic pressure passageway. The first hydraulic pressure passageway is defined in the shaft and is configured to fluidly couple to a hydraulic pressure source. The second hydraulic pressure passageway is defined in the shaft and is configured to couple to the hydraulic pressure source. The first hydraulic pressure passageway includes a first axial passage extending along the rotation axis and a first radial passage extending perpendicularly to and intersecting the first axial passage and extending to a first shaft opening at a circumferential surface of the shaft in communication with the first pressure chamber. The second hydraulic pressure passageway includes a second axial passage extending along the rotation axis and a second radial passage extending perpendicularly to and intersecting the second axial passage and extending to a second shaft opening at the circumferential surface of the shaft in communication with the second pressure chamber.

15. The hydraulic clutch assembly of example 13, wherein the clutch pack is a first clutch pack and the piston is a first piston. The assembly further includes a second clutch pack, a second piston, a second cylinder, a first hydraulic pressure passageway, a third hydraulic pressure passageway, a fourth hydraulic pressure passageway, and a lubrication passageway. The second clutch pack includes a plurality of interleaved plates and discs and is configured to rotationally couple a second rotatable member to the shaft. The second piston is disposed within the internal cavity of the housing. The second piston includes a third piston region configured to engage the second clutch pack and a fourth piston region spaced radially from the third piston region. The second piston is arranged within the housing to define a third pressure chamber between the second piston and the housing. The second cylinder is disposed within the internal cavity of the housing and includes a second hollow interior which receives the fourth piston region to define a fourth pressure chamber between the fourth piston region and the second cylinder. The first hydraulic pressure passageway is defined in the shaft and is configured to fluidly couple the first pressure chamber to a first hydraulic pressure source. The third hydraulic pressure passageway is defined in the shaft and is configured to couple the third pressure chamber to the first hydraulic pressure source. The fourth hydraulic pressure passageway is defined in the shaft and is configured to couple the second and fourth pressure chambers to a third hydraulic pressure source. The lubrication passageway is defined in the shaft and is configured to fluidly couple a lubrication source to a first lubrication shaft opening and a second lubrication shaft opening. The second and fourth pressure chambers are maintained at a constant pressure which is lower than a maximum pressure of one of the first pressure chamber and the third pressure chamber. The first piston includes a first lubrication flow passage which configured to align with the first lubrication shaft opening and allows communication between the first lubrication shaft opening and the internal cavity of the housing when the first clutch pack is engaged. The second piston includes a second lubrication flow passage which is configured to align with the second lubrication shaft opening and allows communication between the second lubrication shaft opening and the internal cavity of the housing when the second clutch pack is engaged.

CONCLUSION

The foregoing has thus disclosed embodiments of assemblies utilized in conjunction with work vehicles, which enable robust and consistent engagement and disengagement of the hydraulic clutch the life of the device. Embodiments of the hydraulic clutch assembly may be implemented with various numbers of clutches and in various transmissions and/or other components (e.g., drive assemblies) of the work vehicle.

As used herein, the singular forms "a", "an," and "the" are intentionally-grown to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intentionally-grown to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A hydraulic clutch assembly for a work vehicle comprising:
    a housing defining an internal cavity;
    a shaft extending within the internal cavity along a rotation axis for rotating a rotatable member, the shaft defining a first hydraulic pressure passageway configured to fluidly couple to a first hydraulic pressure source and defining a second hydraulic pressure passageway configured to couple to a second hydraulic pressure source, the second hydraulic pressure source being at a constant pressure that is lower than a maximum pressure of the first hydraulic pressure source;
    a clutch pack having a plurality of interleaved plates and discs and being configured to rotationally couple the rotatable member to the shaft;
    a piston disposed within the internal cavity of the housing, the piston having a first piston region configured to engage the clutch pack and having a second piston region spaced radially from the first piston region, the piston arranged within the housing to define a first pressure chamber between the piston and the housing; and
    a cylinder disposed within the internal cavity of the housing and having a hollow interior receiving the second piston region to define a second pressure chamber between the second piston region and the cylinder;
    wherein application of hydraulic pressure to the first pressure chamber drives the piston axially toward the clutch pack to apply an engagement force from the first piston region to the clutch pack; and
    wherein application of hydraulic pressure to the second pressure chamber drives the piston axially away from the clutch pack to remove the engagement force of the first piston region from the clutch pack solely with hydraulic pressure.

2. The hydraulic clutch assembly of claim 1, further including a lubrication passageway defined in the shaft and configured to fluidly couple to a lubrication source; wherein the lubrication passageway includes an axial passage extending along the rotation axis and a radial passage extending perpendicularly to and intersecting the axial passage and extending to a lubrication shaft opening at a circumferential surface of the shaft; and
    wherein the piston includes a lubrication flow passage configured to align with the lubrication shaft opening and allow communication of the lubrication shaft opening the internal cavity of the housing when the clutch pack is engaged.

3. The hydraulic clutch assembly of claim 1, wherein the first hydraulic pressure passageway includes a first axial passage extending along the rotation axis and a first radial passage extending perpendicularly to and intersecting the first axial passage and extending to a first shaft opening at a circumferential surface of the shaft in communication with the first pressure chamber; and
    wherein the second hydraulic pressure passageway includes a second axial passage extending along the rotation axis and a second radial passage extending perpendicularly to and intersecting the second axial passage and extending to a second shaft opening at the circumferential surface of the shaft in communication with the second pressure chamber.

4. The hydraulic clutch assembly of claim 3, further including a control valve configured to selectively couple the hydraulic pressure source to either the first hydraulic pressure passageway or the second hydraulic pressure passageway.

5. The hydraulic clutch assembly of claim 4, wherein the control valve is a proportional valve.

6. The hydraulic clutch assembly of claim 1, wherein the clutch pack is a first clutch pack and the piston is a first piston; and
    further including:
        a second clutch pack having a plurality of interleaved plates and discs and being configured to rotationally couple a second rotatable member to the shaft;
        a second piston disposed within the internal cavity of the housing, the second piston having a third piston region configured to engage the second clutch pack and having a fourth piston region spaced radially from the third piston region, the second piston arranged within the housing to define a third pressure chamber between the second piston and the housing; and
        a second cylinder disposed within the internal cavity of the housing and having a hollow interior receiving the fourth piston region to define a fourth pressure chamber between the fourth piston region and the second cylinder.

7. The hydraulic clutch assembly of claim 6, further including an annular section configured to co-rotate with the shaft and disposed axially between the first piston and the second piston and forming, in part, the first pressure chamber and the third pressure chamber.

8. The hydraulic clutch assembly of claim 1, wherein the first piston region and the second piston region are unitary features of the piston with the first piston region defining an annular ring disposed radially outward of and concentric with the second piston region.

9. A hydraulic clutch assembly for a work vehicle comprising:
    a housing defining an internal cavity;
    a shaft extending within the internal cavity along a rotation axis for rotating a rotatable member, the shaft defining a lubrication passageway configured to fluidly couple to a lubrication source;
    a clutch pack having a plurality of interleaved plates and discs and being configured to rotationally couple the rotatable member to the shaft;
    a piston disposed within the internal cavity of the housing, the piston having a first piston region configured to engage the clutch pack and having a second piston region spaced radially from the first piston region, the piston arranged within the housing to define a first pressure chamber between the piston and the housing; and a cylinder disposed within the internal cavity of the housing and having a hollow interior receiving the second piston region to define a second pressure chamber between the second piston region and the cylinder;

wherein the lubrication passageway includes an axial passage extending along the rotation axis and a radial passage extending perpendicularly to and intersecting the axial passage and extending to a lubrication shaft opening at a circumferential surface of the shaft;

wherein the piston includes a lubrication flow passage configured to align with the lubrication shaft opening and allow communication of the lubrication shaft opening the internal cavity of the housing when the clutch pack is engaged;

wherein application of hydraulic pressure to the first pressure chamber drives the piston axially toward the clutch pack to apply an engagement force from the first piston region to the clutch pack;

wherein application of hydraulic pressure to the second pressure chamber drives the piston axially away from the clutch pack to remove the engagement force of the first piston region from the clutch pack solely with hydraulic pressure;

wherein the second piston region is annular and disposed about the shaft, the second piston region having an inner annular section with a radial dimension at a distal end of the piston from the lubrication flow passage;

wherein the shaft includes a shoulder having a radial dimension greater the radial dimension of the inner annular section; and wherein the inner annular section is configured to abut the shoulder of the shaft when the clutch pack is disengaged to obstruct communication of the lubrication flow passage and the lubrication shaft opening.

10. A hydraulic clutch assembly for a work vehicle comprising:
a housing defining an internal cavity;
a shaft extending within the internal cavity along a rotation axis for rotating a rotatable member, the shaft defining a first hydraulic pressure passageway configured to fluidly couple to a hydraulic pressure source and defining a second hydraulic pressure passageway configured to couple to the hydraulic pressure source;
a clutch pack having a plurality of interleaved plates and discs and being configured to rotationally couple the rotatable member to the shaft;
a piston disposed within the internal cavity of the housing, the piston having a first piston region configured to engage the clutch pack and having a second piston region spaced radially from the first piston region, the piston arranged within the housing to define a first pressure chamber between the piston and the housing; and
a cylinder disposed within the internal cavity of the housing and having a hollow interior receiving the second piston region to define a second pressure chamber between the second piston region and the cylinder;

wherein application of hydraulic pressure to the first pressure chamber drives the piston axially toward the clutch pack to apply an engagement force from the first piston region to the clutch pack;

wherein application of hydraulic pressure to the second pressure chamber drives the piston axially away from the clutch pack to remove the engagement force of the first piston region from the clutch pack solely with hydraulic pressure;

wherein the first hydraulic pressure passageway includes a first axial passage extending along the rotation axis and a first radial passage and a fourth radial passage extending perpendicularly to and intersecting the first axial passage and extending to a first shaft opening and a fourth shaft opening, respectively, at a circumferential surface of the shaft, the first shaft opening being in communication with the first pressure chamber and the fourth shaft opening being in communication with the fourth pressure chamber; and wherein the second hydraulic pressure passageway includes a second axial passage extending along the rotation axis and a second radial passage and a third radial passage extending perpendicularly to and intersecting the second axial passage and extending to a second shaft opening and a third shaft opening, respectively, the second shaft opening being in communication with the second pressure chamber and the third shaft opening being in communication with the third pressure chamber.

11. The hydraulic clutch assembly of claim 10, wherein the first pressure chamber and the fourth pressure chamber are in communication via the first hydraulic pressure passageway and the second pressure chamber and the third pressure chamber are in communication via the second hydraulic pressure passageway;
wherein application of pressure to the first hydraulic pressure passageway causes the first piston to engage the first clutch pack and second piston to disengage the second clutch pack; and
wherein application of pressure to the second hydraulic pressure passageway causes the second piston to engage the second clutch pack and the first piston to disengage the first clutch pack.

12. The hydraulic clutch assembly of claim 11, wherein the rotatable member is a first rotatable member; and
further including a second rotatable member coupled to the shaft at an opposite end from the first rotatable member.

13. A hydraulic clutch assembly for a work vehicle comprising:
a housing defining an internal cavity;
a shaft extending within the internal cavity along a rotation axis for rotating rotatable member;
a first clutch pack having a plurality of interleaved plates and discs and being configured to rotationally couple the rotatable member to the shaft;
a second clutch pack having a plurality of interleaved plates and discs and being configured to rotationally couple a second rotatable member to the shaft;
a first piston disposed within the internal cavity of the housing about the shaft, the first piston having a first piston region configured to engage the first clutch pack and having a second piston region spaced radially from the first piston region, the first piston arranged within the housing to define a first pressure chamber between the first piston and the housing;
a second piston disposed within the internal cavity of the housing, the second piston having a third piston region configured to engage the second clutch pack and having a fourth piston region spaced radially from the third piston region, the second piston arranged within the housing to define a third pressure chamber between the second piston and the housing;

a first cylinder disposed within the internal cavity of the housing about the shaft and having a hollow interior receiving the second piston region to define a second pressure chamber between the second piston region and the first cylinder;

a second cylinder disposed within the internal cavity of the housing and having a second hollow interior receiving the fourth piston region to define a fourth pressure chamber between the fourth piston region and the second cylinder;

a first hydraulic pressure passageway defined in the shaft and configured to fluidly couple the first pressure chamber to a first hydraulic pressure source;

a third hydraulic pressure passageway defined in the shaft and configured to couple the third pressure chamber to the first hydraulic pressure source;

a fourth hydraulic pressure passageway defined in the shaft and configured to couple the second and fourth pressure chambers to a third hydraulic pressure source; and a lubrication passageway defined in the shaft and configured to fluidly couple a lubrication source to a first lubrication shaft opening and a second lubrication shaft opening;

wherein application of hydraulic pressure to the first pressure chamber drives the first piston axially toward the first clutch pack to apply an engagement force from the first piston region to the first clutch pack;

wherein application of hydraulic pressure to the second pressure chamber drives the first piston axially away from the first clutch pack to remove the engagement force of the first piston region from the first clutch pack solely with hydraulic pressure;

wherein the second and fourth pressure chambers are maintained at a constant pressure which is lower than a maximum pressure of one of the first pressure chamber and the third pressure chamber;

wherein the first piston includes a first lubrication flow passage configured to align with the first lubrication shaft opening and allow communication between the first lubrication shaft opening and the internal cavity of the housing when the first clutch pack is engaged; and wherein the second piston includes a second lubrication flow passage configured to align with the second lubrication shaft opening and allow communication between the second lubrication shaft opening and the internal cavity of the housing when the second clutch pack is engaged.

14. The hydraulic clutch assembly of claim 13, further comprising a second hydraulic pressure passageway defined in the shaft;

wherein the first hydraulic pressure passageway includes a first axial passage extending along the rotation axis and a first radial passage extending perpendicularly to and intersecting the first axial passage and extending to a first shaft opening at a circumferential surface of the shaft in communication with the first pressure chamber; and wherein the second hydraulic pressure passageway includes a second axial passage extending along the rotation axis and a second radial passage extending perpendicularly to and intersecting the second axial passage and extending to a second shaft opening at the circumferential surface of the shaft in communication with the second pressure chamber.

* * * * *